US012371142B1

(12) United States Patent
Slocum et al.

(10) Patent No.: US 12,371,142 B1
(45) Date of Patent: Jul. 29, 2025

(54) REMOTE GENERATION OF LIFTING GAS

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

(*) Notice: Subject to any disclaimer, the term of this patent is extended or adjusted under 35 U.S.C. 154(b) by 0 days.

(21) Appl. No.: 18/609,776

(22) Filed: Mar. 19, 2024

Related U.S. Application Data

(62) Division of application No. 17/586,759, filed on Jan. 27, 2022, now Pat. No. 11,964,748.

(60) Provisional application No. 63/164,482, filed on Mar. 22, 2021, provisional application No. 63/156,305, filed on Mar. 3, 2021, provisional application No. 63/142,072, filed on Jan. 27, 2021.

(51) Int. Cl.
*B64B 1/64* (2006.01)
*B64B 1/40* (2006.01)
*B64B 1/62* (2006.01)

(52) U.S. Cl.
CPC ............. *B64B 1/64* (2013.01); *B64B 1/40* (2013.01); *B64B 1/62* (2013.01)

(58) Field of Classification Search
CPC ................ B64B 1/40; B64B 1/62; B64B 1/64
See application file for complete search history.

(56) References Cited

U.S. PATENT DOCUMENTS

| | | | | |
|---|---|---|---|---|
| 2007/0057116 | A1* | 3/2007 | Sinsabaugh | B64B 1/62 244/96 |
| 2010/0288875 | A1* | 11/2010 | Barnes | B64B 1/62 244/96 |
| 2012/0223181 | A1* | 9/2012 | Ciampa | B64B 1/62 244/30 |
| 2017/0203827 | A1* | 7/2017 | Marcum | B64B 1/50 |

\* cited by examiner

*Primary Examiner* — Tye William Abell
(74) *Attorney, Agent, or Firm* — The Marbury Law Group, PLLC

(57) ABSTRACT

According to one aspect, a system for launching an aerostat may include an inflatable structure defining a volume having a neck, a reactor defining a chamber, a coupling releasably secured in fluid communication between the chamber and the neck, and a drain valve within the volume, the drain valve in a first position away from the neck to receive a lifting gas from the chamber into the volume via the coupling, the drain valve movable from the first position to a second position when the coupling is released from fluid communication between the chamber and the neck, and the drain valve in the second position in sealed engagement with the inflatable structure along the neck to control accumulation of condensate from the lifting gas within the volume.

6 Claims, 29 Drawing Sheets

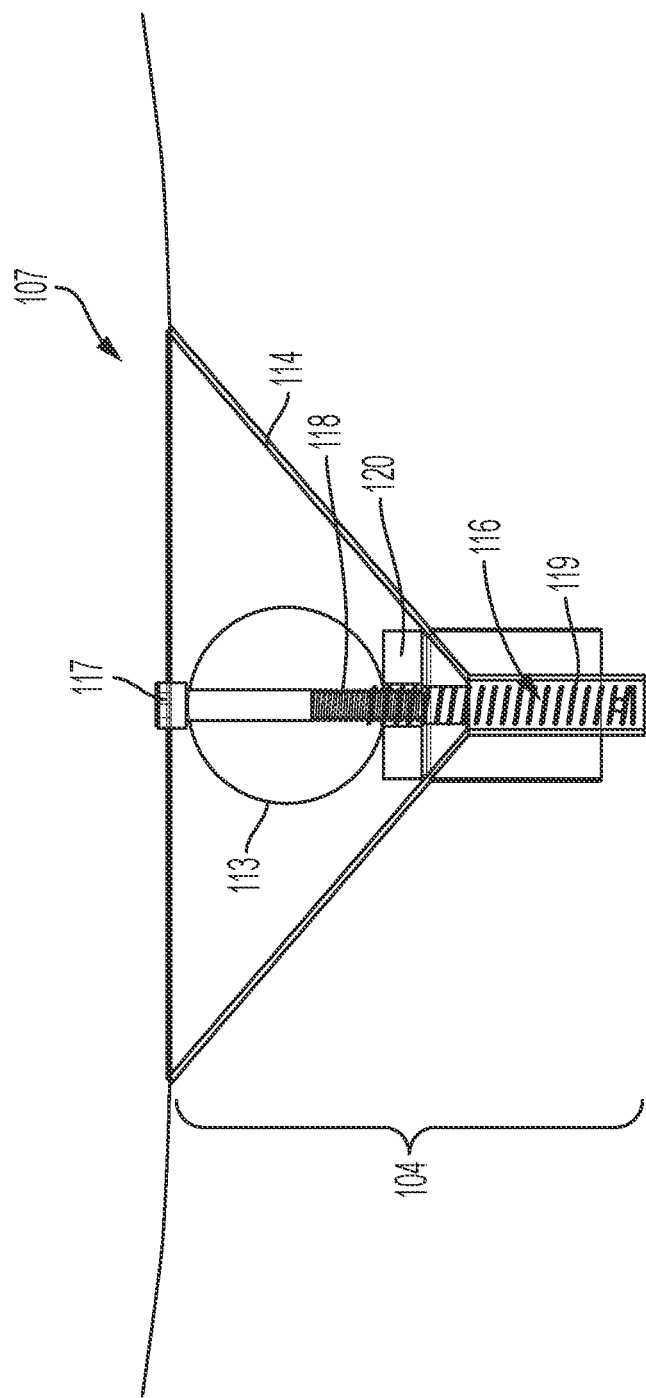

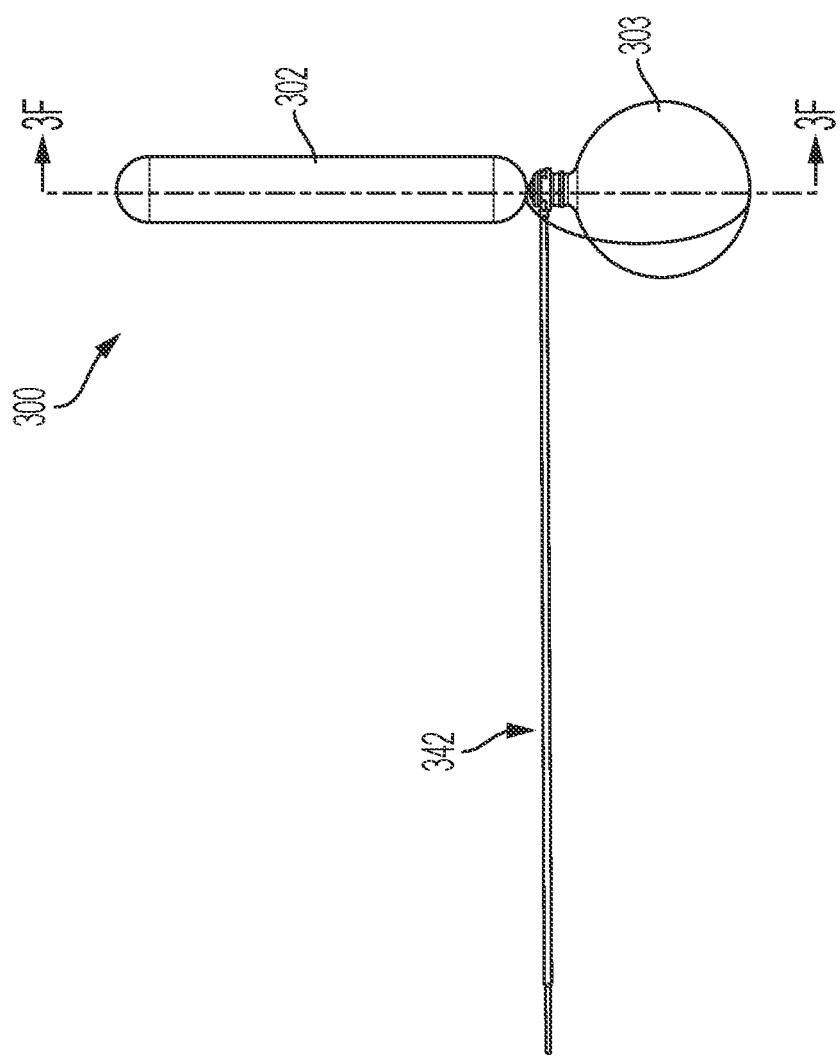

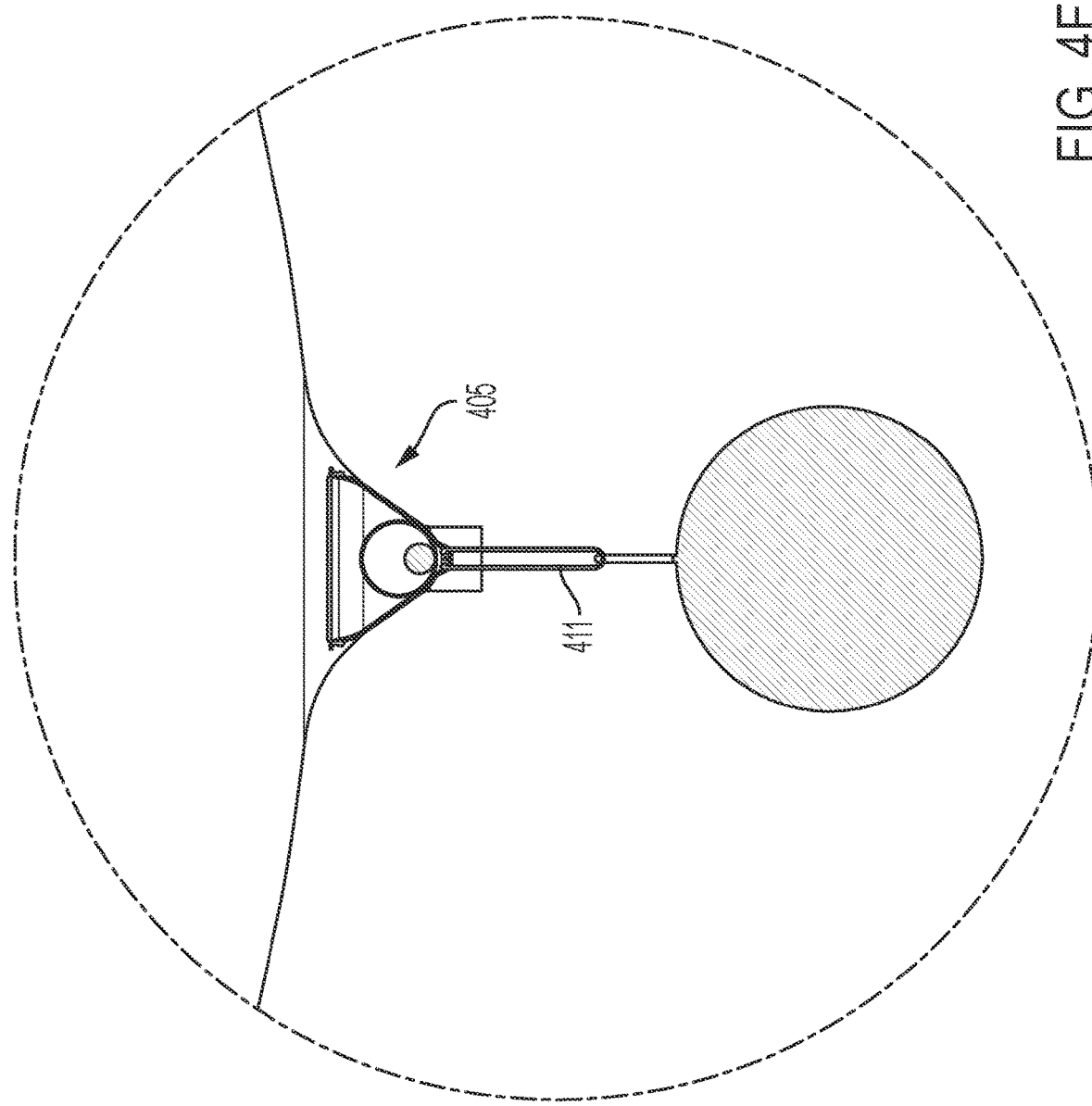

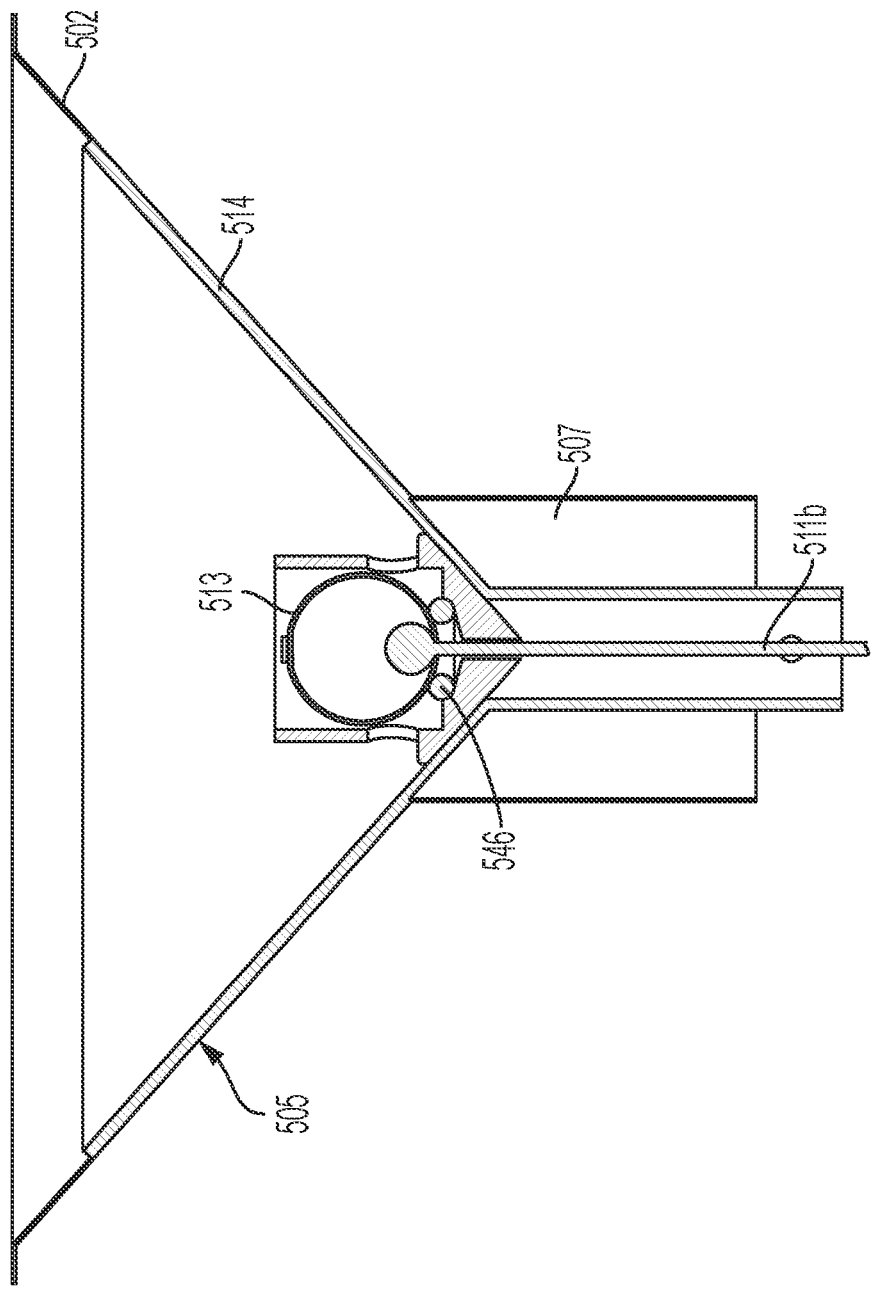

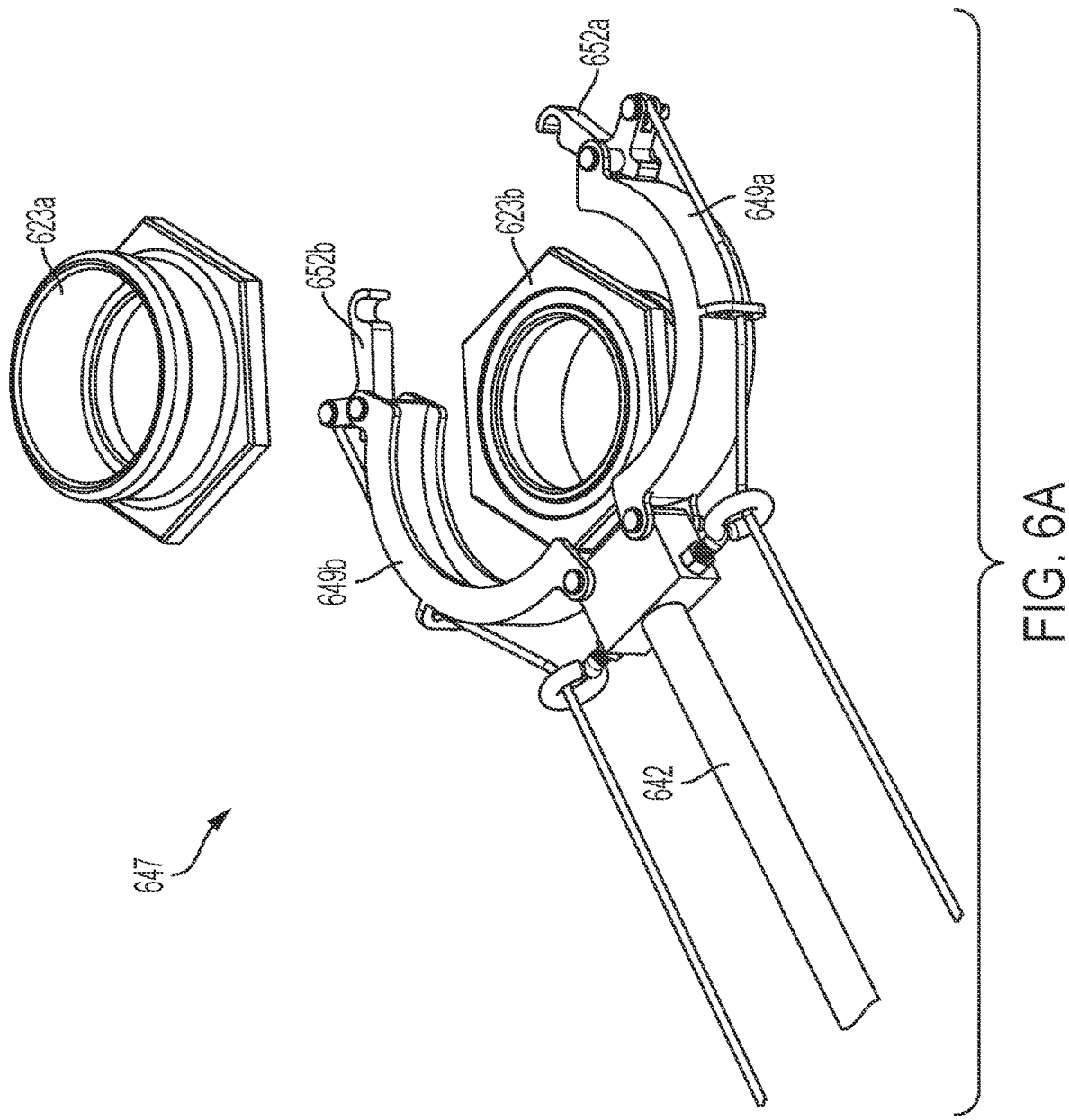

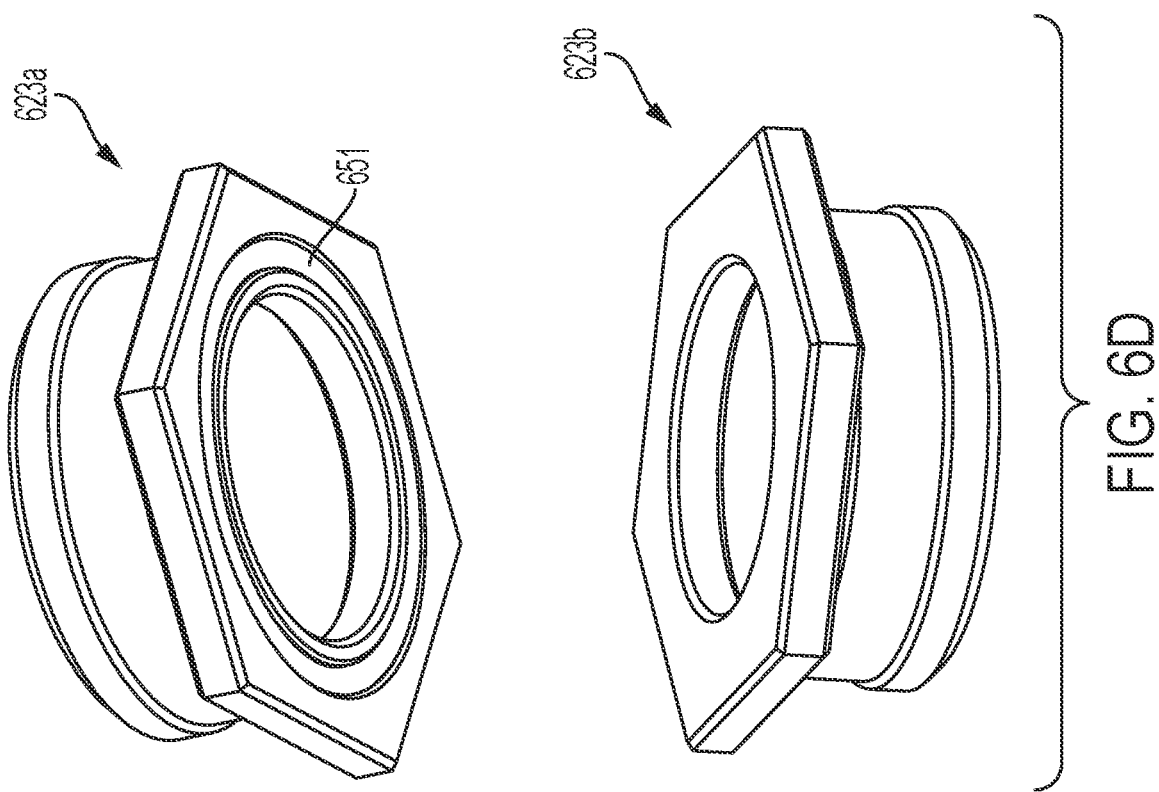

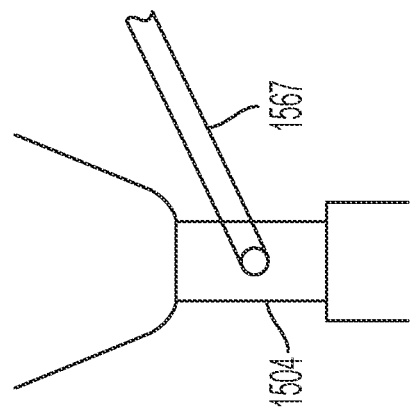
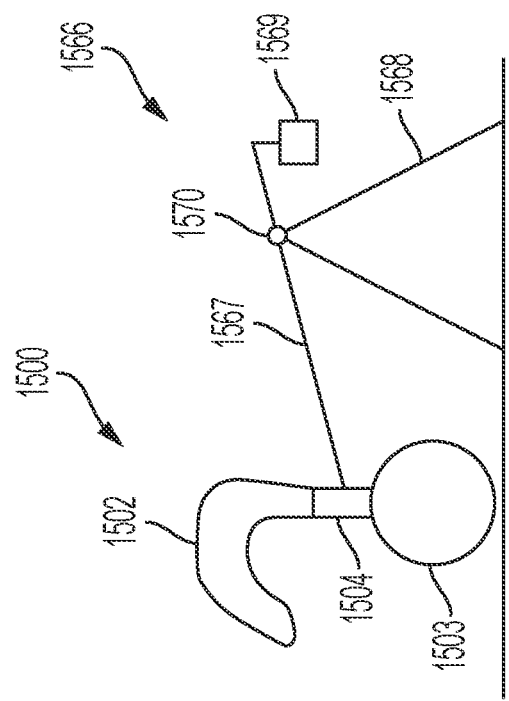

REMOTE GENERATION OF LIFTING GAS

CROSS-REFERENCE TO RELATED APPLICATIONS

This application is a divisional of U.S. patent application Ser. No. 17/586,759, filed Jan. 27, 2022, which claims priority to U.S. Provisional Application Ser. No. 63/142,072, filed Jan. 27, 2021, to U.S. Provisional Application Ser. No. 63/156,305, filed Mar. 3, 2021, and to U.S. Provisional Application Ser. No. 63/164,482, filed Mar. 22, 2021, with the entire contents of each of these applications hereby incorporated herein by reference.

GOVERNMENT LICENSE RIGHTS

This invention was made with government support under FA8702-15-D-0001 awarded by the United States Air Force. The government has certain rights in the invention.

BACKGROUND

Balloons can be filled with a lifting gas to allow the balloon to float in any one or more of various different media. As an example, balloons in the form of weather balloons are commonly used for meteorological observation. Such weather balloons provide localized weather conditions that may not be accurately measurable using ground-based measurements or satellite images.

The types of applications in which balloons are useful are, however, constrained by the resources and quality of lifting gases required to impart buoyancy to balloons. That is, the time and equipment required for inflation can make balloons unsuitable for many implementations in the field, away from established infrastructure. Further, the performance of balloons can be significantly impacted by composition of the lifting gas itself, resulting in suboptimal—or at least unpredictable—flight of the balloon as composition of the lifting gas and/or environmental conditions change during the course of a given flight.

Accordingly, there remains a need for making balloon inflation and flight more robust across a variety of field conditions, while using equipment and resources amenable to transport and rapid deployment.

SUMMARY

According to one aspect, a system for launching an aerostat may include an inflatable structure defining a volume having a neck, a reactor defining a chamber, a coupling releasably secured in fluid communication between the chamber and the neck, and a drain valve within the volume, the drain valve in a first position away from the neck to receive a lifting gas from the chamber into the volume via the coupling, the drain valve movable from the first position to a second position when the coupling is released from fluid communication between the chamber and the neck, and the drain valve in the second position in sealed engagement with the inflatable structure along the neck to control accumulation of condensate from the lifting gas within the volume.

In some implementations, the coupling may be in mechanical communication with the inflatable structure, and the coupling is releasable from fluid communication with the inflatable structure via transmission of a force of expansion of the chamber of the reactor.

In certain implementations, the system may further include one or more tethers coupled to the drain valve, wherein at least one of the one or more tethers is tensionable to move the drain valve from the first position to the second position. Additionally, or alternatively, the system may further include a payload coupled to the at least one of the one or more tethers, wherein the tether is tensionable, via weight of the payload, to move the drain valve from the first position to the second position.

In some implementations, the drain valve may include a float and a funnel, the funnel is in sealed engagement with the inflatable structure along the neck when the drain valve is in the second position and, with the drain valve in the second position, the float is buoyantly movable relative to a seat region in the funnel to control accumulation of condensate from lifting gas within the volume. The float may have a first hardness and the seat region of the funnel has a has a second hardness, and the first hardness is greater than the second hardness. Further or instead, the float may have a density less than the density of water. A range of movement of the float may be restricted to be within a predetermined distance relative to the seat region in the funnel at least when the drain valve is in the second position. For example, the predetermined distance of the range of movement of the float relative to the seat region of the funnel is less than 3 cm. Further, or instead, the float may be biased against the seat region of the funnel at least when the drain valve is in the second position via tension on at least one tether. As an example, the drain valve may further include a spring, the spring is coupled to the float and to at least one tether, and the range of movement of the float relative to the seat region is restricted via tension on the at least one tether. Additionally, or alternatively, a bias force of the float against the seat region of the funnel may be greater than about ten percent and less than about 50 percent of the weight of the float.

In certain implementations, the coupling may include a conduit defining a flow path in fluid communication between the chamber of the reactor and the neck of the inflatable structure, the coupling includes a one or more valves supported along the conduit, and at least one of the one or more valves is actuatable to control a flow of the lifting gas from the chamber into the volume via the flow path. At least one of the one or more valves may be actuatable based on one or more parameters indicative of pressure in the chamber of the reactor. Further or instead, the at least one of the one or more valves may be actuatable based on expansion of the chamber of the reactor. Additionally, or alternatively, the one or more valves may include a butterfly valve including a disk rotatably supported along the flow path of the conduit, and rotation of the disk is controllable to control fluid communication between the chamber of the reactor and the neck of the inflatable structure. In certain instances, the system may further include a pressure sensor in mechanical communication with the chamber of the reactor to measure a signal indicative of pressure in the chamber of the reactor, and at least one of the one or more valves is actuatable based on the signal indicative of pressure in the chamber of the reactor. The coupling may, for example, be releasable from the inflatable structure via one or more forces parallel to a longitudinal axis defined by at least a portion of the flow path of the conduit. Further, or instead, the coupling may be releasable from the inflatable structure in response to a buoyancy force of the inflatable structure containing the lifting gas in the volume, and the buoyancy force is above a predetermined threshold buoyancy force. Additionally, or alternatively, the coupling may include a first connector portion, the inflatable structure includes a second connector portion, the first connector portion and the second connector portion are secured to one another when the flow path of the conduit and the volume of the inflatable structure are in fluid communication with one another, and the first connector portion and the second connector portion are releasable from one another through movement of one or both of the first connector portion and the second connector portion relative to one another along a longitudinal axis defined by the flow path of the conduit.

In some implementations, the system further include support legs secured to the coupling, the support legs positionable on a level surface to support the coupling above the level surface.

According to another aspect, an aerostat may include an inflatable structure defining a volume having a neck, a drain valve within the volume of the inflatable structure, and at least one tether coupled to the drain valve within the volume and securable to a payload outside of the volume, the drain valve movable from a first position to a second position in the volume in response to tension on the tether from weight of the payload secured to the tether, the first position of the drain valve spaced from the neck to receive a lifting gas into the volume of the inflatable structure, and the drain valve in the second position in sealed engagement with the inflatable structure along the neck to control accumulation of condensate from the lifting gas within the volume.

According to another aspect, a coupling for delivering a lifting gas to launch an aerostat may include a conduit having a first end region and a second end region defining a longitudinal axis therebetween, the conduit defining a flow path along the longitudinal axis, a butterfly valve including a disk supported along the flow path, the disk rotatable about an axis transverse to the longitudinal axis, a first connector portion disposed along the first end region of the conduit, and a motor mechanically coupled to the disk and to the first connector portion, the motor actuatable to move the first connector portion in a direction parallel to the longitudinal axis in coordination with rotation of the disk about the axis transverse to the longitudinal axis.

In some implementations, the coupling may further include a shaft, a pulley, and a cord, wherein the shaft extends along the axis transverse to the longitudinal axis, the shaft is coupled to the motor, the disk and the pulley are each fixedly coupled to the shaft, and the first connector portion and the pulley are coupled to one another via the cord, and actuation of the motor rotates the shaft to rotate the disk of the butterfly valve in the flow path to control fluid communication along the flow path, and continued actuation of the motor rotates the pulley to tension the cord to decouple the first connector portion from a second connector portion.

In certain implementations, the coupling may further include a controller including a processing unit and one or more computer-readable storage media, the one or more computer-readable storage media having stored thereon instructions for causing the processing unit to carry out operations including actuating the motor to move the disk of the butterfly valve back and forth between a first position and a second position to control fluid communication between the first end region and the second end region of the conduit along the flow path, and actuating the motor to wrap the cord about the pulley to release the first connector portion from a second connector portion.

BRIEF DESCRIPTION OF THE FIGURES

FIG. 1C is a close-up view along the area of detail 1C in FIG. 1B, with the drain valve shown in the second position in sealed engagement with the neck of the volume.

FIG. 3E is a side view of the system of FIG. 3A, shown with forks of the stabilizing pole extending through the coupling to hold the inflatable structure in place on the reactor.

FIG. 4F is a schematic representation of the float valve of FIG. 4A shown positioned in a neck of a volume defined by an inflatable structure.

FIG. 5 is a schematic representation of a float valve positioned in a neck of a volume defined by an inflatable structure, the float valve including a first tether and a second tether.

FIG. 6A is a perspective view of a clamp assembly including a first connector portion, a second connector portion, a pole, and jaws, with the first connector portion and the second connector portion shown spaced apart from one another and the jaws shown in an open position.

FIG. 6D is a perspective view of the first connector portion and the second connector portion of the clamp assembly of FIG. 6A.

FIG. 15A is a schematic representation of a system for launching an aerostat, the system including an inflatable structure, a reactor, a coupling, and a stabilization assembly.

FIG. 15B is a schematic representation of a portion of the system of FIG. 15A, showing a connection between the coupling and a lever of the stabilization assembly.

Like reference symbols in the various drawings indicate like elements.

DETAILED DESCRIPTION

Figure 1B:
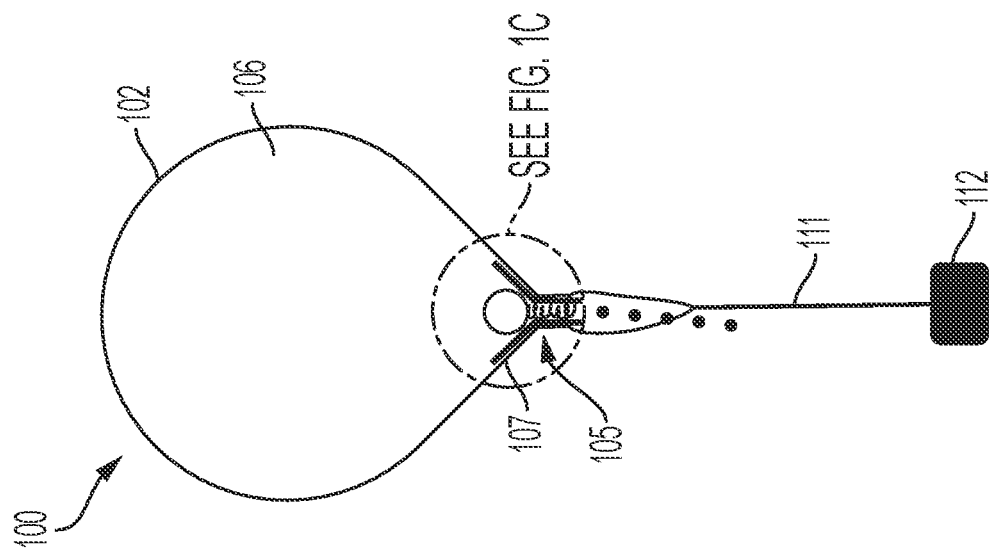
FIG. 1B is a schematic representation of the inflatable structure of the system of FIG. 1A, shown with the drain valve in a second position in sealed engagement with the neck of the volume.
Figure 1A:
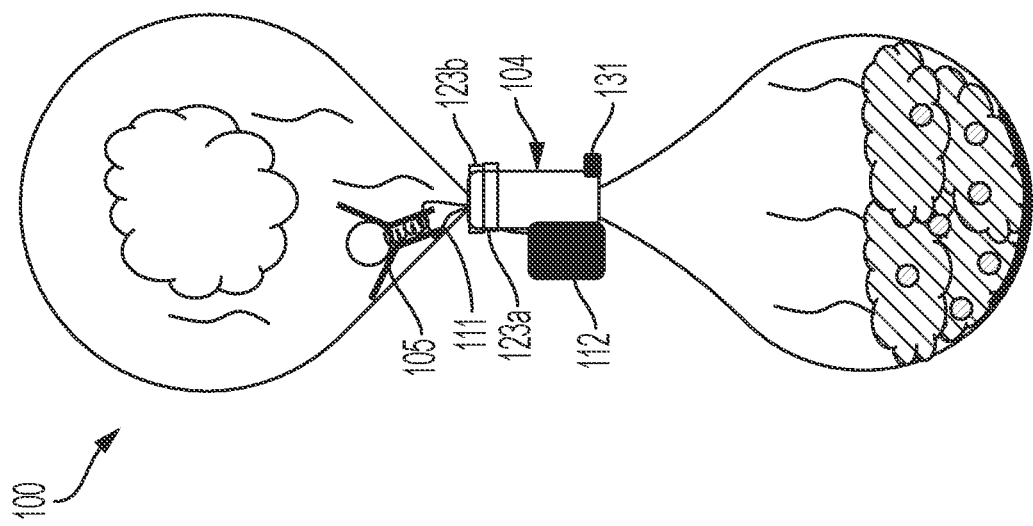
FIG. 1A is a schematic representation of a system for launching an aerostat, with the system including an inflatable structure, a reactor, a coupling, and a drain valve, with the drain shown in a first position away from a neck of a volume defined by the inflatable structure.
Figure 1E:
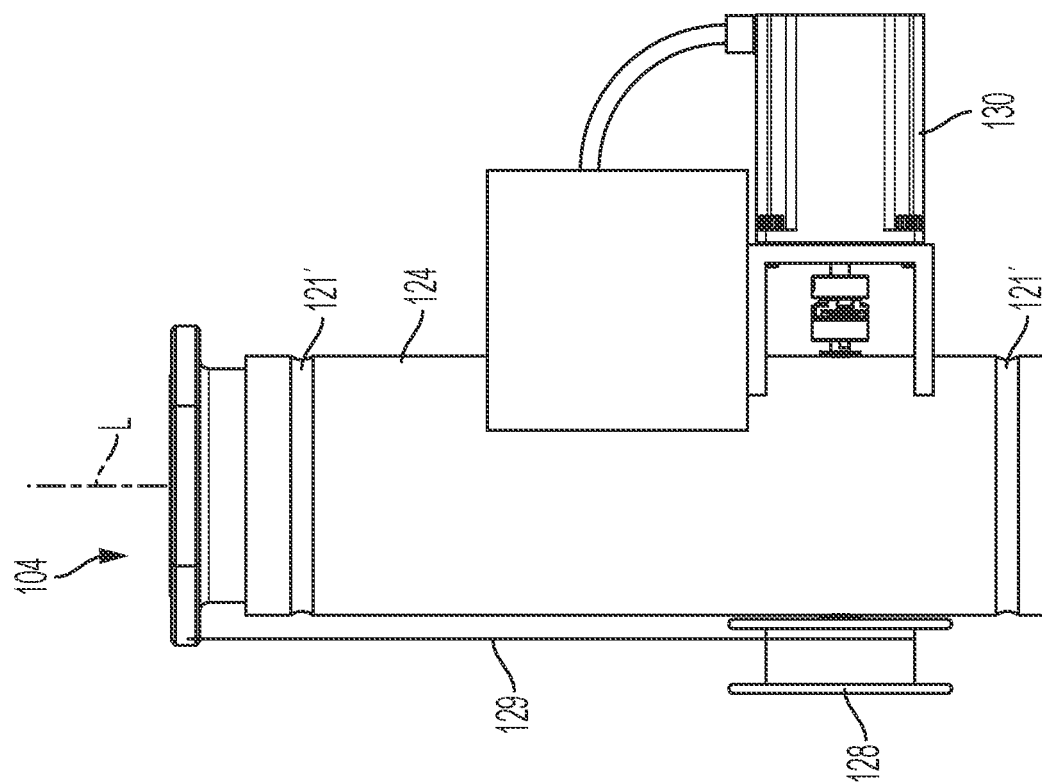
FIG. 1E is a side view of the coupling of FIG. 1D.
Figure 1D:
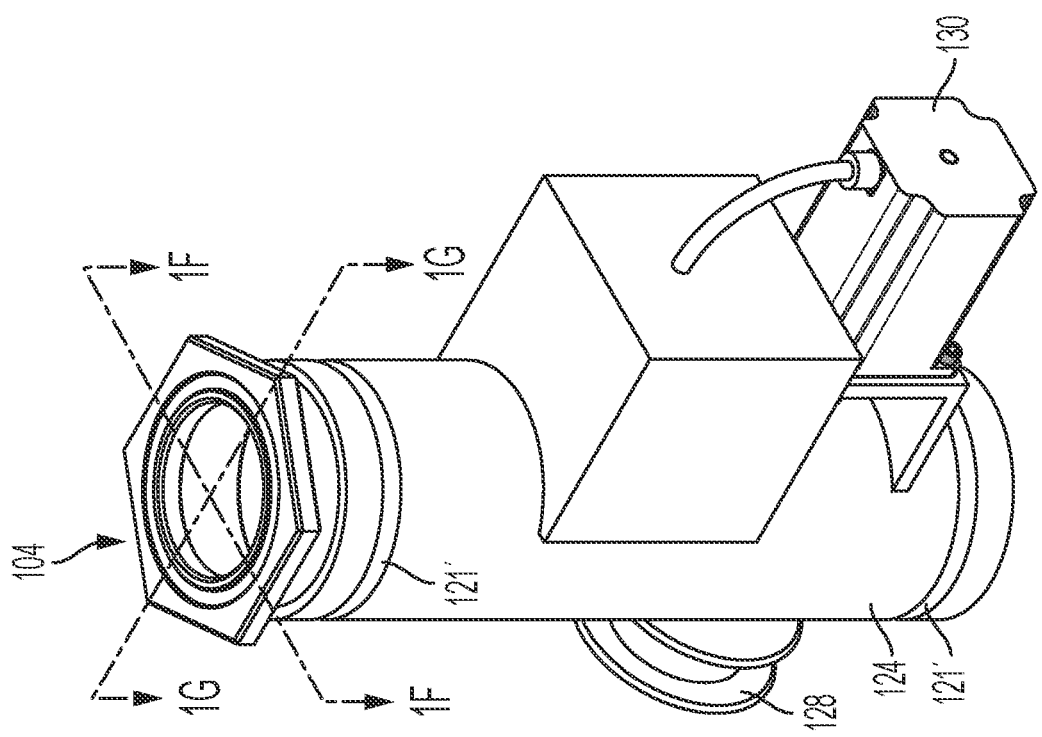
FIG. 1D is a perspective view of the coupling of the system of FIG. 1A.
Figure 1G:
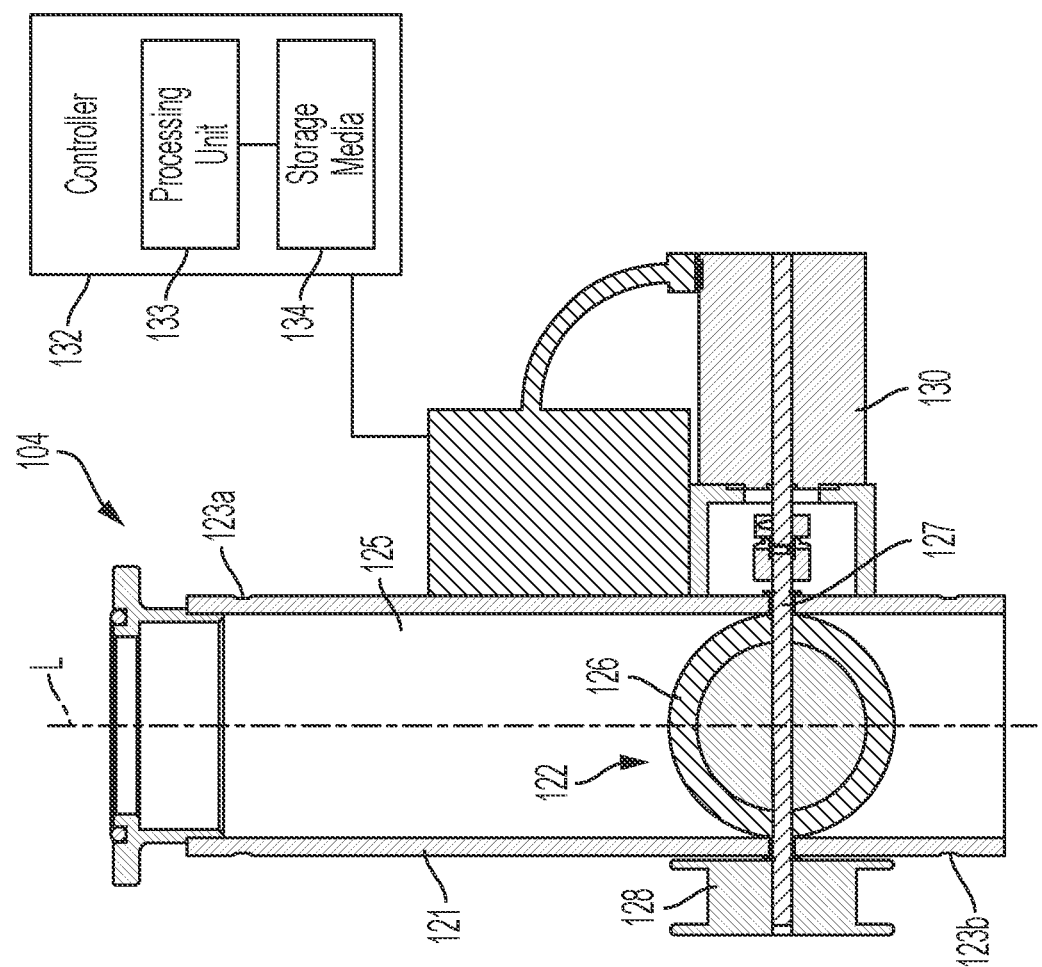
FIG. 1G is a side view of a second cross-section of the coupling of FIG. 1D, taken along the cross-section 1G-1G in FIG. 1D.
Figure 1F:
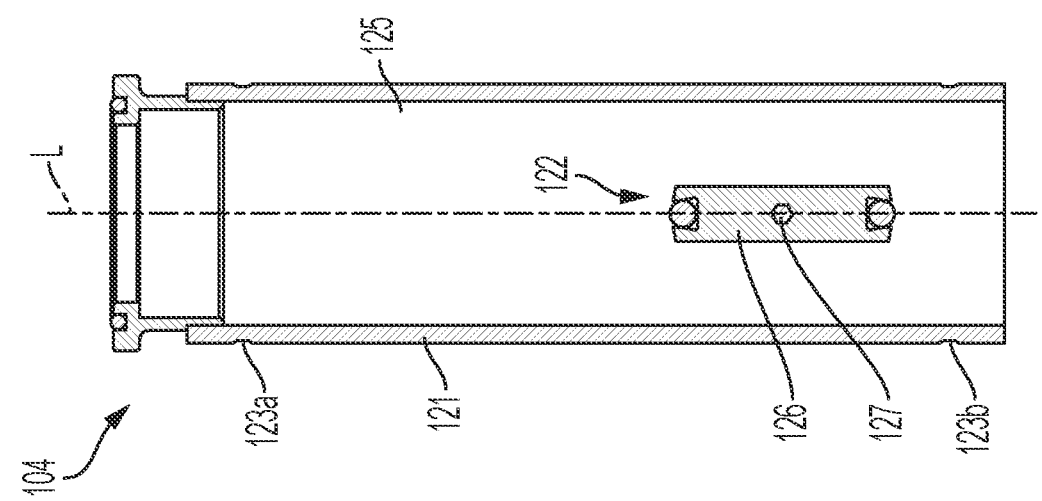
FIG. 1F is a side view of a first cross-section of the coupling of FIG. 1D, taken along the cross-section 1F-1F in FIG. 1D.
Figure 1H:
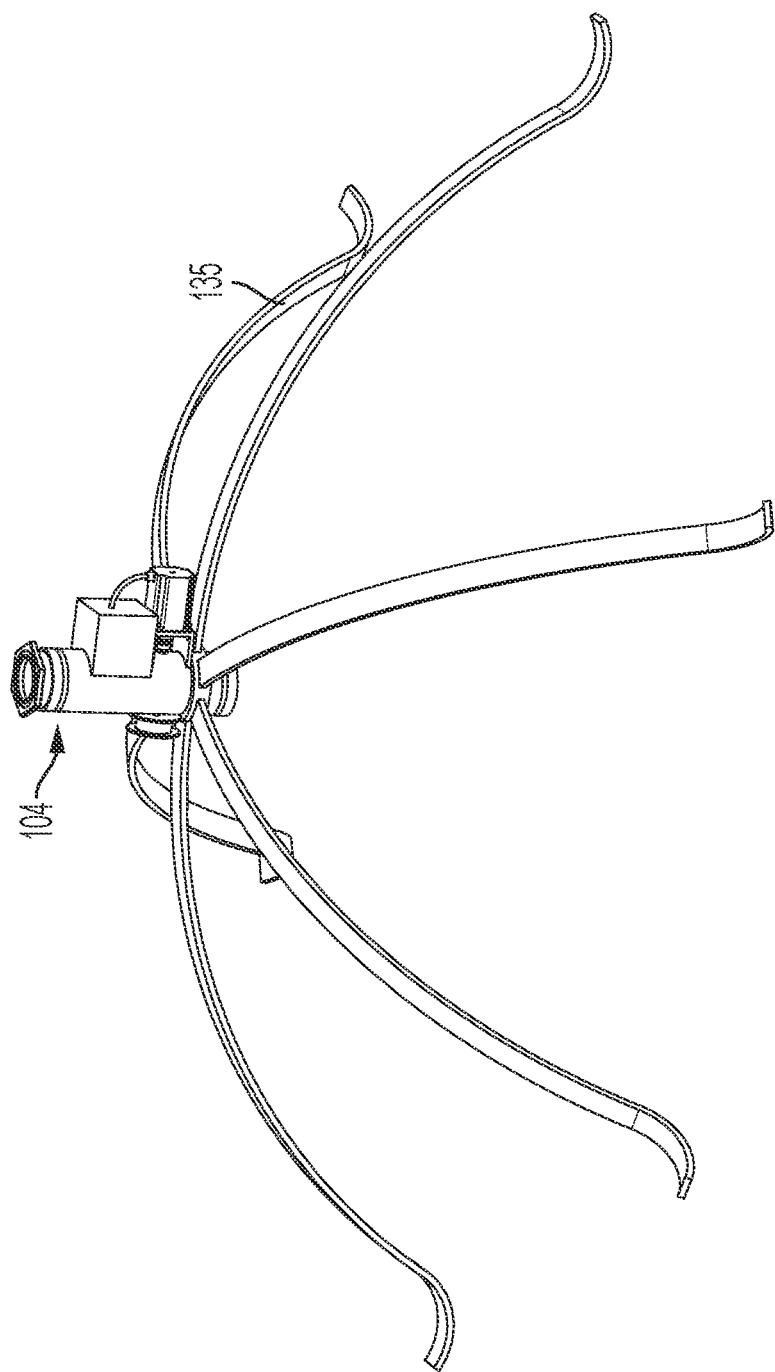
FIG. 1H is a perspective view of the coupling of the system of FIG. 1A supported on support legs.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the description that follows, deployment of inflatable structures is generally described. As used herein, the term "inflatable structure" shall be understood to include a balloon connected in fluid communication to a chamber of a reactor or a balloon by itself (e.g., after the reactor has been jettisoned in instances in which the balloon is intended to be released from the reactor). For example, the various different systems described herein facilitate rapid inflation of the balloon such that, in some instances, deployment of an inflatable structure may include releasing a system (e.g., midair or in water) while the balloon is being filled with lifting gas being generated in the chamber of the reactor such that the inflatable structure may at least initially include the balloon connected in fluid communication to the chamber of the reactor. In some implementations, the reactor may be jettisoned from the balloon once the balloon after the balloon has been filled with lifting gas and, in such use cases, the inflatable structure shall be understood to include only the balloon following disconnection of the balloon from the reactor.

As used herein, unless otherwise specified or made clear from the context, the term "balloon" shall be understood to include any manner and form of object that can receive lifting gas to have at least some degree of buoyancy in ambient air, in water, or in any other medium, whether in an indoor or an outdoor environment. In use, such balloons may be used to make observations (e.g., about weather in the atmosphere, conditions below or around the balloon), carry passengers and/or cargo, broadcast and/or receive signals beyond the balloon, collect data, lift structures, etc. Accordingly, as used herein, balloons may include any one or more of various different manned or unmanned craft, dirigible or non-dirigible craft, independently propelled or floating craft, rigid or nonrigid craft, tethered or untethered craft, or combinations thereof.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor).

For the sake of clear and efficient description, elements with numbers having the same last two digits in the disclosure that follows shall be understood to be analogous to or interchangeable with one another, unless otherwise explicitly made clear from the context, and, therefore, are not described separately from one another, except to note differences or to emphasize certain features.

Referring now to FIGS. 1A-1H, a system 100 for launching an aerostat 101 may include an inflatable structure 102, a reactor 103, a coupling 104, and a drain valve 105. The inflatable structure 102 may define a volume 106 having a neck 107, and the reactor 103 may define a chamber 108. In general, the coupling 104 may be releasably secured in fluid communication between the chamber 108 of the reactor 103, and the neck 107 of the inflatable structure 102 such that a lifting gas formed in the chamber 108 of the reactor 103 may be controllably flowed into the volume of the inflatable structure 102 to make the inflatable structure 102 buoyant. As described in greater detail below, the drain valve 105 may be disposed within the volume 106 and movable from a first position (shown in FIG. 1A) away from the neck 107 to a second position (shown in FIG. 1B) in sealed engagement with the inflatable structure 102 along the neck 107.

In use, as also described in greater detail below, activated aluminum 109 may be reacted with water in the chamber 108 of the reactor 103 to produce a lifting gas. The activated aluminum 109 may include activated aluminum, such as set forth in U.S. Pat. No. 10,745,789, issued to Jonathan Thurston Slocum on Aug. 18, 2020, and entitled "Activated Aluminum Fuel," the entire contents of which are hereby incorporated herein by reference. The coupling 104 may be actuated according to any one or more of the various different techniques described herein to control a flow of the lifting gas 110 from the chamber 108 of the reactor 103 into the volume 106 to inflate the inflatable structure 102 according to the needs of a particular end-use of the aerostat 101. While the lifting gas 110 is described herein as being produced from reaction of the activated aluminum 109 with water, it shall be understood that devices, systems, and methods of the present disclosure may be applied to any one or more of various different types of lifting gases containing steam and produced at or near the point of end-use of the lifting gas.

The reaction of water and activated aluminum 109 in the chamber 108 produces a lifting gas 110 including hydrogen and steam. In the reaction of the activated aluminum 109 with water, about half the energy released goes to heat and half to generate hydrogen. As a result, typically about eight times as much steam is generated by volume than hydrogen. Thus, a large amount of extra lift in the aerostat 101 is possible if the inflatable structure 102 is filled quickly with steam and hydrogen and is sent aloft. Further, the time required to inflate the inflatable structure 102 with the lifting gas 110 may be important, or even critical, for launching an aerostat 101 to achieve desired objectives of a particular mission (e.g., rapidly acquiring observational data and/or evading detection at a launch site). While these factors weigh in favor of moving the lifting gas 110 into the volume 106 as rapidly as possible, such rapid movement of the lifting gas 110 into the volume can bring, along with it, ejecta from the rapid and vigorous production of hydrogen by reacting the activated aluminum 109 with water in the reactor 103. The ejecta, can damage and/or impair the inflatable structure 102. Further, without interventional measures, the ejecta and condensation of steam into water in the volume 106 are a parasitic payload (known as dead weight) that impairs flight performance of the aerostat 101.

Movement of the drain valve 105 from the first position to the second position, as described herein, may facilitate reconciling the foregoing competing considerations of rapid inflation and flight performance. Such throttling may produce turbulence or otherwise modify the flow to reduce the likelihood that ejecta produced in the reaction in the chamber 108 will enter the volume 106 of the inflatable structure 102. Thus, stated differently, the throttling produced by the drain valve 105 in the first position may reduce the likelihood that ejecta associated with the rapid production of the lifting gas 110 will damage the inflatable structure 102 and/or be carried as dead weight in the volume 106 during flight of the aerostat 101. Once the volume 106 of the inflatable structure 102 is filled with the lifting gas 110, the drain valve 105 may move to the second position, where the drain valve 105 may release condensate from the volume 106 while maintaining a seal between the volume 106 and an environment outside of the volume 106 to reduce the likelihood of unintended escape of the lifting gas 110 from the volume 106. That is, in the second position, the drain valve 105 may facilitate achieving improved flight performance by draining condensate that forms over time (and becomes dead weight) while retaining the lifting gas 110 that provides buoyancy to the aerostat 101. Thus, as compared to an aerostat including a drain valve in a fixed position, the movability of the drain valve 105 from the first position to the second position may facilitate launching the aerostat 101 faster while achieving the same or improved flight performance.

In general, the drain valve 105 may be movable from the first position to the second position according to any one or more of various different techniques that may be appropriate for a particular type of deployment of the aerostat 101. For example, the drain valve 105 may be moved from the first position to the second position manually by an operator. Additionally, or alternatively, the drain valve 105 may be advantageously coupled to one or more other portions of the system 100 such that force transmitted from the one or more other portions of the system 100 may move the drain valve 105 from the first position to the second position without operator intervention, as may be particularly useful for rapid deployment of the aerostat 101. That is, by coupling the drain valve 105 to one or more other portions of the system 100 according to the various different techniques described herein, the aerostat 101 may be quickly detached to fly away once the inflatable structure 102 is sufficiently inflated.

In certain implementations, the drain valve 105 may be coupled to a tether 111 extending from the drain valve 105 and outside of the volume 106 such that the tether 111 may be tensioned according to any one or more of various different techniques described herein to pull the drain valve 105 from the first position within the volume 106 to the second position in sealed engagement with the neck 107 of the inflatable structure 102. Unless otherwise specified or made clear from the context, any and all mentions of the tether 111 or variants thereof shall be understood to include one or more instances of the tether 111, for example as may be useful for separately actuating different portions of the drain valve 105 and/or operating the drain valve 105 in coordination with one or more other aspects of launching the aerostat 101, as described in greater detail below. To the extent that a single instance of the tether 111 is shown and/or described, this is for the of readability of the text and, unless another intent is explicitly stated, the tether 111 shall be understood to include one or more instances of the tether 111.

The tether 111 may be elongate and generally flexible along a longitudinal dimension in the absence of a tensile load while being tensionable to be pulled taut in response to a tensile force applied to the tether 111 along the longitudinal dimension. Thus, for example, the tether 111 may include any one or more of various different types of rope, cord, wire, or the like, that are advantageously inexpensive and readily sourced. Further, or instead, the tether 111 may includes one or more loops (e.g., forming a lanyard) as may be useful to secure the tether 111 to the drain valve 105 and/or to any one or more other portions of the system 100 as part of operation of the system 100 according to any one or more of the various different techniques described herein. Further, or instead, the tether 111 may be resistant to heat, moisture, or both, such that the strength of the tether 111 does not degrade significantly in the event of exposure to heat from the lifting gas 110 and/or to the lifting gas 110 itself.

In many implementations, the aerostat 101 may include a payload 112, such as may be useful for carrying out any one or more aspects of a particular end-use of the aerostat 101. As one of numerous examples, the payload 112 may include equipment for gathering information about conditions in the air and/or on the ground. That is, more generally, the payload 112 has weight that must be lofted through flight of the aerostat 101 to carry out objectives of a mission. In such instances, the tether 111 may be tensionable, via weight of the payload 112, to move the drain valve 105 from the first position to the second position. Thus, while the weight of payloads is ordinarily parasitic to flight performance of aerostats, weight of the payload 112 on the tether 111 may pull the tether 111 taut and, in doing so, may increase the quality of the seal between the drain valve 105 and the neck 107 of the inflatable structure 102. Further, the weight of the payload 112 coupled to the drain valve 105 via the tether 111 may provide ballast to help stabilize the aerostat 101 during flight.

In instances in which the lifting gas 110 in the volume 106 of the inflatable structure 102 initially includes hydrogen and steam produced from the activated aluminum 109, the payload 112 liftable by the aerostat 101 can be up to four times heavier than a payload liftable using hydrogen alone. Accordingly, as steam in the lifting gas 110 condenses, the lift capacity of the lifting gas 110 in the inflatable structure 102 decreases significantly. Thus, in certain implementations, one or more portions of the payload 112 may be released from the aerostat 101 during later stages of flight to accommodate the decreasing lift capacity of the lifting gas 110 as moisture condenses from the lifting gas 110 during flight. In turn, such release of the payload 112 may reduce the tension on the drain valve 105 via the tether 111. However, in some cases, a film of moisture may collect between the drain valve 105 and the inflatable structure 102 along the neck 107 during flight of the aerostat 101. Continuing with this example, the seal provided by such a film of moisture may make up for a reduction in tension on the drain valve 105 such that the drain valve 105 may remain in sealed engagement in the neck 107 of the inflatable structure 102 as one or more portions of the payload 112 are discarded during flight.

In certain implementations, the tether 111 may additionally, or alternatively, facilitate releasing the inflatable structure 102 from the coupling 104 such that the aerostat 101 may lift the payload 112 to carry out one or more objectives of a mission. As an example, with the drain valve 105 in the first position, the tether 111 coupled to the drain valve 105 may extend from the volume 106 (e.g., via the neck 107) to the payload 112 outside of an environment outside of the inflatable structure 102. As a more specific example, the tether 111 may be pressed between the inflatable structure 102 and the coupling 104 as the drain valve 105 is in the first position away from the neck 107 and the lifting gas 110 moves into the volume 106. The tether 111 pressed between the inflatable structure 102 and the coupling 104 may have limited movement such that, in turn, the drain valve 105 may have limited movement within the volume 106. For example, in the first position, the drain valve 105 may be limited to move a predetermined distance from the neck 107 (e.g., a distance greater than about 2 cm and less than about 20 cm) as the lifting gas 110 moves into the volume 106. Limiting movement of the drain valve 105 within a predetermined distance from the neck 107 may facilitate throttling the flow of the lifting gas 110 into the volume 106 of the inflatable structure 102 to reduce the likelihood of accumulation of ejecta in the volume 106 of the inflatable structure 102. To limit movement of the drain valve 105 within the volume 106 and/or to reduce the likelihood of inadvertent flow of the lifting gas 110 out of the system 100 via the path of the tether 111 pressed between the inflatable structure 102 and the coupling 104, it may be generally desirable to use any one or more of various different techniques (e.g., use of one or more compliant materials, one or more grooves in the space between the inflatable structure 102 and the coupling 104, non-linear arrangement of the tether 111, clamps, etc.) that may limit movement of the drain valve 105 and/or leaks between the inflatable structure 102 and the coupling 104.

Continuing with the example of the tether 111 pressed between the inflatable structure 102 and the coupling 104, the tether 111 in this position may advantageously facilitate releasing the inflatable structure 102 from the coupling 104. In particular, the once the lifting gas 110 has filled the volume 106 of the inflatable structure 102, the inflatable structure 102 may be released by pulling up (e.g., manually and/or through one or more actuators) on a portion of the tether 111 disposed outside of the volume 106. The resulting movement of the tether 111 in response to being pulled in this way may peel the neck 107 of the inflatable structure 102 away from the coupling 104, allowing the aerostat 101 to float away from the coupling 104. The payload 112 may be releasably attached (e.g., through the use of a hook-and-loop fastener) to the coupling 104 and, as the inflatable structure 102 lifts away from the coupling 104, tension in the tether 111 may decouple the payload 112 from the coupling 104 such that the payload 112 may be lifted by the aerostat 101. Additionally, or alternatively, in instances in which the inflatable structure 102 is expandable, the tether 111 may be coupled to a portion of the inflatable structure 102 away from the neck 107 and expansion of the inflatable structure 102 upon inflation with the lifting gas 110 may pull on the tether 111 to peel the neck 107 of the inflatable structure 102 away from the coupling 104. More generally, while the use of the tether 111 in this way is advantageous in terms of simplicity and robustness, one or more other techniques may be used to release the inflatable structure 102 from the coupling 104, as described in greater detail below.

In some instances, the drain valve 105 may include a float 113 and a funnel 114. With the drain valve 105 in the second position, the funnel may be in sealed engagement with the inflatable structure 102 along the neck 107. With the funnel 114 in this position, the float 113 may be buoyantly movable relative to a seat region of the funnel 114 to control accumulation of condensate from the lifting gas 110 within the volume. That is, as condensate collects in the funnel 114, the buoyancy force of the condensate on the float 113 may move the float 113 away from the seat region 115 of the funnel 114 to allow some of the condensate to flow out of the volume 106 via the funnel 114. Advantageously, when the float 113 moves away from the seat region 115 to open the drain valve 105, some condensate may remain in the funnel 114 to form a barrier reducing the likelihood that the lifting gas 110 will escape while a portion of the condensate is being expelled from the volume 106. That is, by being buoyancy-actuated, movement of the float 113 relative to the seat region 115 of the funnel 114 advantageously reduces parasitic load of a portion of the condensate while preserving lift capacity of the lifting gas 110 in the volume 106 of the inflatable structure 102. This may facilitate achieving improved flight performance of the aerostat 101 as compared to allowing the condensate to collect in the volume 106.

In general, the float 113 may be formed of any one or more of various different materials that are robust in the presence of moisture and hot and cold extremes. For example, the float 113 may be formed of one or more inexpensive and ubiquitous materials, such as plastic, rubber, wood, metal, or a combination thereof. Further, or instead, the float 113 may have a density less than the density of water, as may be useful moving the float 113 away from the seat region 115 using a small volume of the condensate. In turn, the ability to expel small volumes of condensate reduces the parasitic losses associated with carrying larger volumes of condensate required to displace denser materials.

In certain instances, the float 113 may have a first hardness and the seat region 115 of the funnel 114 may have a second hardness less than the first hardness, as may be useful for maintaining the seat region 115 of the funnel 114 in good contact around a circumference of the funnel 114. Among other things, this may be useful for retaining a residual amount of condensate in the funnel 114 as the drain valve 105 as components of the aerostat 101 and/or the lifting gas 110 experience changes in temperature. Additionally, or alternatively, such a difference in hardness may make operation of the drain valve 105 more robust with respect to deformation of the drain valve 105 and/or the presence of small amounts of solid material (e.g., ice) in the drain valve 105.

A range of movement of the float 113 may, in some implementations, be restricted to within a predetermined distance relative to the seat region 115 of the funnel 114, as least when the drain valve 105 is in the second position in the neck 107 of the inflatable structure 102. For example, the float 113 may be restricted to within a predetermined distance of less than about 3 cm relative to the seat region 115 of the funnel 114 when the drain valve 105 is in the second position in the neck 107 of the volume 106. Within this range of travel, the float 113 may return to the seat region 115 of the funnel 114 quickly, particularly in instances in which the float 113 is not biased toward the seat region 115.

In certain instances, the funnel 114 may be coupled to the tether 111. With the payload 112 also coupled to the tether 111 and the aerostat 101 beginning to float, the weight of the payload 112 may pull the funnel 114 from the first position to the second position in the neck 107 of the inflatable structure 102 to seal the funnel 114 in place in the neck 107 of the inflatable structure 102 such that egress from the volume 106 is through the funnel 114. To the extent the float 113 is limited to move a predetermined distance relative to the seat region 115 of the funnel 114, the float 113 move along with the funnel 114 and may become quickly seated within the seat region 115 of the funnel 114. Further, or instead, it shall be appreciated that limiting movement of the float 113 to a predetermined distance relative to the seat region 115 of the funnel 114 may be advantageous for forming the funnel 114 with a size large enough to protect the float 113 from damage while having an overall size amenable to being pulled quickly and repeatably into sealed engagement with the neck 107 of the inflatable structure 102 to facilitate rapidly launching the aerostat 101.

Implementations may include biasing the float 113 against the seat region 115 of the funnel 114 at least when the drain valve 105 is in the second position in the neck 107, via tension on the tether 111. For example, as the aerostat 101 rises and steam condenses in the volume 106, the condensate may displace the float 113 from the seat region 115 of the funnel 114 such that the condensate may drain out of the aerostat 101. Continuing with this example, a portion of the tether 111 may be coupled to the float 113 and to the payload 112 and, once the condensate has been condensed and drained, the float 113 may be biased to seat against the seat region 115 of the funnel 114 through tension on the tether 111. It shall be appreciated that a single instance of the tether 111 may be coupled to the payload 112 and have a first portion coupled to the funnel 114 and a second portion coupled to the float 113. However, as indicated above, the tether 111 may include multiple instances—such as a first tether and a second tether that are not directly connected to one another—and, for the sake of clarity and efficiency, such multiple instances are not described separately.

In various implementations, the drain valve 105 may further include a spring 116 to facilitate controlling the predetermined distance (gap) that the float 113 moves relative to the seat region 115 of the funnel 114 that is opened when the float 113 moves away from the seat region 115 under buoyancy force of condensate collected in the funnel 114. For example, spring 116 may be coupled to the float 113 and to tether 111 such that the tether 111 anchors portion of the spring 116 while the portion of the spring 116 coupled to the float 113 is free to move within the funnel 114. As an example, the tether 111 may extend through a hole in the funnel 114 and through the spring 116 to secure the spring 116 in place in the funnel 114. The float 113 on the other end of the spring 116 may be, for example, a hollow sphere.

As a specific example, the float 113 may be a hollow polypropylene ball (such as a 2" ball) having a hole drilled through its axis, which can be located by molding dimples. A bolt 117 (e.g., a plastic ⅜" bolt 92a, such as a nylon bolt)

with epoxy or silicone sealant under its head may be placed through placed through the float 113. On a threaded portion 118 of the bolt 117, coils 119 of the spring 116 are threaded up into the float 113, and epoxy or silicone sealant secures the spring 116 and seals the float 113. In the funnel 114, a rubber grommet 120 (e.g., a rubber plug with end removed to expose hole through) is epoxied in place, and the seat region 115 is adhered to the rubber grommet 120. The seat region 115 may include a soft and heat resistant closed cell foam (e.g., resilient high-temperature silicone foam with adhesive back) from which a washer is punched with 7/16 inch inner diameter and 1 inch outer diameter.

Table 1 below shows a specific example of design parameters for the drain valve 105 including the float 113 and the funnel 114. In the example shown in Table 1, the spring 116 is a compression spring with an inner diameter of 0.306 inches, a wire size of 0.018 inches, and a length of 4 inches ±0.05 inches.

TABLE 1

Example design parameters of a drain valve including a float and a funnel.

| | | |
|---|---|---|
| Float ball diameter | 5 | cm |
| Float ball volume | 65.4 | cm^3 |
| Maximum buoyant force | 0.641 | N |
| | 65.4 | grams |
| Float system mass | | |
| Plastic bolt | 9 | grams |
| plastic ball | 15 | grams |
| spring | 6 | grams |
| epoxy | 1 | grams |
| Total float mass | 31 | grams |
| Percent of total buoyant force to preload | 30% | |
| | 19.6 | grams |
| Preload force desired from spring | 0.192 | N |
| | 0.678 | ounces |
| Spring rate | 0.12 | lb/in |
| | 0.021 | N/mm |
| Pretension displacement required | 9.2 | mm |
| Net force to displace spring above seat | 0.146 | N |
| | | grams |
| Displacement of spring above seat | 6.9 | mm |

While the float 113 has been described as being preloaded against the seat region 115 using a coil spring, it shall be appreciated that any one or more other types of biasing may be used. For example, the spring 116 may include a cantilever beam flexure type spring or a torsion spring. Further, or instead, more than one instance of the drain valve 105 may be arranged in series with one another to provide additional sealing quality for extended missions.

The buoyancy force required to displace the float 113 from the seat region 115 increases with increasing volume of the float 113. Thus, a larger spring force may be required to ensure a more effective seal as the volume of the float 113 increases. If the rate of condensation in the volume 106 is higher than the rate at which the condensate is drained by the drain valve 105, the maximum opening allowed by the spring 116 will occur. If the inflatable structure is in cold weather or at high altitude, the condensate should drain quickly before the condensate can freeze and, thus, a spring preload of the float 113 against the seat region 115 may be light (e.g., on the order of 10 percent of the weight of the float 113). Without wishing to be bound by theory, it is believed that the small amount of water remaining after all the steam condenses will freeze and seal the drain valve 105. In temperatures above freezing conditions, a higher spring preload force may be desirable to produce deformation of the seat region 115 of the funnel 114, giving a better seal to retain the lifting gas 110 within the volume 106. In such instances, a spring preload of the float 113 against the seat region 115 may be about 50 percent. For example, it has been found that a spring preload of about 30 percent of the weight of the float 113 allows water to leave the volume 106 quickly to maintain lift and reduce the likelihood that water will gather to the side of the funnel 114, making it difficult to drain.

While the float 113 has been described as being spherical in some implementations, it shall be appreciated that the float 113 may alternatively have a cone-like shape in some instances. In instances in which the float 113 is a cone, an additional 30 percent buoyancy may be obtained as compared to a sphere having a diameter equal to the height of the cone. Another advantage of the float 113 having a cone-like shape, is that the cone-like shape may be less likely to become unseated from the seat region 115 of the funnel 114 as the inflatable structure 102 and/or the tether 111 experience unusual forces. For cone-like shapes, a hydrophilic coating may be useful for attracting water and, thus, forming a better seal between the float 113 and the funnel 114. Additionally, or alternatively, the funnel 114 may include a hydrophilic coating to facilitate sealing engagement in the neck 107 of the inflatable structure 102.

In general, the reactor 103 may have a greater stiffness than the inflatable structure 102 to facilitate efficient movement of the lifting gas 110 from the chamber 108 of the reactor 103 into the volume 106 of the inflatable structure 102 when fluid communication therebetween is unrestricted. In some implementations in which portability of the reactor 103 is not a primary concern, the reactor 103 may be formed of one or more rigid materials (e.g., a steel drum or a section of corrugated HDPE culvert pipe, etc). In other instances, the reactor 103 may be flexible and compliant to facilitate transport, storage, and handling. As an example, stiffness of the reactor 103 may be varied by layering multiple balloons (e.g., latex balloons) in a nested structure so that more layers will result in the reactor 103 being stiffer than the inflatable structure 102. Such layering may also be advantageous for allowing the chamber 108 of the reactor 103 to expand more evenly since defects in any given layer may be mitigated across the other layers. To facilitate allowing the layers to slide against one another, a dry lubricant such as corn starch or talc may be used between adjacent layers. The inflatable structure 102 may additionally or alternatively be formed using such layering, albeit generally using fewer layers than used for formation of the reactor 103 according to this technique.

Further, or instead, the reactor 103 may be generally heavier than the inflatable structure 102 such that the reactor 103 may act as a counterweight to the inflatable structure 102 as the inflatable structure 102 is being inflated (e.g., in high wind conditions). Still further or instead, as described in greater detail below, the coupling 104 may include a valve controllable, in some cases, based on pressure in the chamber 108. In such instances, the reactor 103 may be exposed to less stress that may damage the reactor 103.

In general, the coupling 104 may control fluid communication between the chamber 108 of the reactor 103 and the volume 106 of the inflatable structure 102. Such control may be achieved, for example, through decoupling the coupling 104 from at least the inflatable structure 102 as the aerostat 101 is launched. Further. Or instead, control of fluid communication between the chamber 108 and the volume 106 may be achieved through the use of one or more valves actuatable to control fluid communication while the coupling 104 remains mechanically coupled to the reactor 103 and to the inflatable structure 102. As described in greater detail below, one or more valves of the coupling 104 may be additionally, or alternatively, controllable to control introduction of one or more reactants into the chamber 108 to facilitate, among other things, forming the lifting gas 110 under consistent conditions.

The coupling 104 may, for example, include a conduit 121, a valve 122, at least one instance of a first connector portion 123a. The conduit 121 may have a first end region 124a and a second end region 124b defining a longitudinal axis L therebetween, and the conduit 121 may define a flow path 125 along the longitudinal axis L. A groove 121' may be defined along one or more of the first end region 124a or the second end region 124b to facilitate slipping the inflatable structure 102 and/or the reactor 103 over a respective end region of the conduit 121 and secured in place with zip ties, elastic bands, cord, or the like. In instances in which the system 100 is sized for use with 1 kg of the activated aluminum 109, the conduit 121 may have a 3 inch inner diameter and a 3.5 inch outer diameter and further, or instead, formed of a strong plastic such as clear polycarbonate.

The first connector portion 123a may be disposed at least along the first end region 124a of the conduit 121. The first connector portion 123a may be releasably securable to a mating (second) connector portion to mechanically couple the coupling 104 to the inflatable structure 102. Unless otherwise specified or made clear from the context, it shall be understood that the first connector portion 123a may be any one or more of various different types of connectors described herein. For example, the first connector portion 123a may be part of a sanitary coupling and/or a quick disconnect connector. Further, or instead, for the sake of clear and efficient explanation, the coupling 104 is depicted as having an instance of the first connector portion 123a along the first end region 124a while the reactor 103 may be securable to the coupling 104 as described above with respect to positioning the reactor 103 in the groove 121' along the second end region and using a restraint. This may be a useful configuration, given that it may be generally desirable to quickly and remotely decouple the coupling 104 from the inflatable structure 102 once the aerostat 101 is ready for flight, while there is typically less urgency with respect to decoupling the second end region 124b from the reactor 103. Nevertheless, it shall be understood that another instance of the first connector portion 123a may be disposed along the second end region 124b to releasably secure the coupling 104 in fluid communication with the chamber 108 of the reactor 103. This additional instance of the first connector portion 123a is not separately described for the sake of efficiency and readability.

In general, the valve 122 may be any one or more of various different types of valves that may be actuatable to control fluid communication between the chamber 108 of the reactor 103 and the volume 106 of the inflatable structure 102 before, during, and after the lifting gas 110 moves from the chamber 108 into the volume 106 to fill the inflatable structure 102 for launch. In certain instances, the valve 122 may be manually operable, as may be useful for forming the system 100 within a compact and light form factor. In other instances, however, the valve 122 may be automatically controlled (e.g., electronically and/or through movement of one or more other components), as may be particularly useful for remote operation of the system 100. For example, as described in greater detail below, the valve 122 may be controllable via actuation of one or more motors. In some implementations, a pressure sensor 131 positioned relative to the chamber 108 of the reactor 103 (e.g., in mechanical communication with the chamber 108 of the reactor) to measure a signal indicative of pressure in the chamber of the reactor 103. In turn, the valve 122 may be actuatable based on the signal indicative of pressure in the chamber 108 according to any one or more of various different strategies. While the valve 122 may be actuatable based on the pressure sensor 131 in some instances, the valve 122 may also or instead be actuatable in response to expansion of the chamber 108 of the reactor 103. For example, the valve 122 may be actuatable to release automatically if the chamber 108 expands to actuate movement of the valve 122. While a single instance of the valve 122 is described, additional instances of the valve 122 may be positioned along the flow path 125 and controlled together or individually, without departing from the scope of the present disclosure.

The valve 122 may be, for example, a butterfly valve including a disk 126 supported along the flow path 125 and rotatable about an axis transverse to the longitudinal axis L. That is, through rotation of the disk 126, a flow of the lifting gas 110 from the chamber 108 to the volume 106 may be increased or decreased. Further, or instead, the disk 126 may be sized relative to the flow path 125 such that the disk 126 may be positioned to interrupt the flow of the lifting gas 110. Still further, or instead, the disk 126 may be initially transverse to the flow path 125 such that activated aluminum 109 may be supported on the disk 126 prior to using the system 100 to form the lifting gas 110. By rotating the disk 126 from this initial position, the activated aluminum 109 may fall from the disk 126 and into the chamber 108, where the activated aluminum 109 may be exposed with water to form the lifting gas 110. While the valve 122 has been described as a butterfly valve, it shall be appreciated that any one or more other types of valves (e.g., ball valves) may be used to carry out various different aspects of control described herein, unless a contrary intention is indicated or made clear from the context.

In some implementations, the coupling 104 may include a motor 130 (e.g. a stepper motor) mechanically coupled to the disk and to the first connector portion 123a. The motor 130 may be actuatable to move the first connector portion 123a in a direction parallel to the longitudinal axis L in coordination with rotation of the disk 126 about the axis transverse to the longitudinal axis L. For example, the coupling 104 may further include a shaft 127, a pulley 128, and a cord 129. The shaft 127 may be coupled to the motor 130 (e.g., with a high parallel misalignment shaft coupling 127') and extend along the axis transverse to the longitudinal axis L. The disk 126 and the pulley 128 may each be fixedly coupled to the shaft 127 and further, or instead, the first connector portion 123a and the pulley 128 may be coupled to one another via the cord 129. Actuation of the motor 130 may rotate the shaft 127 to rotate the disk 126 in the flow path 125 to control fluid communication of the flow path 125. Continued actuation of the motor 130—beyond rotation associated with rotation of the disk 126—may rotate the pulley 128 to tension the cord 129 to decouple the first connector portion 123a from a second connector portion 123b on the inflatable structure 102. That is, the first connector portion 123a and the second connector portion 123b may be secured to one another when the flow path 125 of the conduit 121 and the volume 106 of the inflatable structure 192 are in fluid communication with one another, and the first connector portion 123a and the second connector portion 123b may be releasable from one another through movement of one or both of the first connector portion 123*a* and the second connector portion 123*b* relative to one another along the longitudinal axis L.

While the motor 130 may be actuatable to release the first connector portion 123*a* from a complimentary connector portion on the inflatable structure 102, the motor 130 may be additionally, or alternatively actuatable to peel the inflatable structure 102 from the coupling 104. For example, in such instances, the tether 111 may be wound about the pulley 128, and actuation of the motor 130 to rotate the pulley 128 in a first direction may move the tether 111 to peel the inflatable structure 102 from the coupling 104 as described above. Continuing with this example, actuation of the motor 130 rotate the pulley 128 in a second direction (opposite the first direction) until the tether 111 is free of the pulley 128 and the aerostat 101 may float freely away from the coupling 104.

While the motor 130 may be actuatable to release the inflatable structure 102 from the coupling 104 in some instances, the buoyancy of the inflatable structure 102 itself may additionally or alternatively release the inflatable structure 102 from the coupling 104. For example, with a buoyancy force above a predetermined threshold force, the first connector portion 123*a* and the second connector portion 123*b* may be releasable from one another such that the aerostat 101 may lift away from the coupling 104.

In certain implementations, the coupling 104 may include a controller 132 including a processing unit 133 and the one or more computer-readable storage media 134. The one or more computer-readable storage media 134 may have stored thereon instructions for causing the processing unit 133 to carry out any one or more of the various different operations described herein, such as may be useful for operating the system 100 remotely (e.g., on terrain that is not easily accessed by personnel or in mid-air). As an example, the one or more computer-readable storage media 134 may have stored thereon instructions for causing the processing unit 133 to carry out operations including actuating the motor 130 to move the disk 126 of the valve 122 back and forth between a first position and a second position to control fluid communication between the first end region 124*a* and the second end region 124*b* of the conduit 121 along the flow path 125, and actuating the motor 130 to wrap the cord 129 about the pulley 128 to release the first connector portion 123*a* from a second connector portion 123*b*. In certain implementations, the controller 132 may include a battery and a wireless link for remote actuation of the controller 132.

Under certain conditions, the reactor 103 may undergo unintended movement as the lifting gas 110 inflates the inflatable structure 102. Such unintended movement may result kinking of the reactor 103 and, in turn, may slow or interrupt inflation of the inflatable structure 102. Thus, in some implementations, the system 100 may include support legs 135 secured to the coupling 104 and positionable on a level surface to support the coupling 104 above the level surface. With the coupling 104 supported by the support legs 135, the reactor 103 may be below the coupling 104 and held in place by the support legs 135 as the reactor 103 expands. While the support legs 135 may be outside of the reactor 103 in some cases, it shall be understood the support legs 135 may be additionally or alternatively positionable within the chamber 108 of the reactor 103 to facilitate restricting movement of the reactor 103 relative to the coupling 104. Further, or instead, the support legs 135 may have a radius of about 4 feet and, in some instances, the support legs 1335 may fold to facilitate transport.

Having described various aspects of the system 100, attention is turned now to description of an exemplary method of operating the system 100 to inflate the inflatable structure 102. The reactor 103 may be attached to the second end region 124*b* and secured into the groove 121' along the second end region 124*b* using a zip tie or another clamping-type element to press the reactor 103 into the groove 121'. With the reactor 103 secured to the coupling 104, a desired amount of water may be added to the chamber 108 (e.g., seven liters of water to react with 1 kg of the activated aluminum 109). The valve 122 may be initially in a closed position such that the activated aluminum 109 may be introduced into the coupling 104 via the first end region 124*a* and may remain supported in the flow path 125, away from the water in the chamber 108. With the activated aluminum 109 supported by the valve 122 in the flow path 125, the inflatable structure 102 may be coupled to the to the first end region 124*a* according to any one or more of the various different techniques described herein, such as by coupling the first connector portion 123*a* to the second connector portion 123*b*. A signal (e.g., a wireless signal) may be sent to the controller 132 and, in response to the signal, the controller 132 may actuate the motor 130 to move the valve 122 (e.g., moving the disk 126 back and forth).

As the valve 122 moves in response to the actuation of the motor 130, the activated aluminum 109 supported on the valve 122 may fall into the water in the chamber 108 of the reactor 103. The valve 122 may be moved to a closed position as the activated aluminum 109 begins to react with the water in the chamber 108. After a predetermined time and/or based on a signal from the pressure sensor 131 the controller 132 may actuate the motor 130 to open the valve 122. For example, by keeping the valve 122 closed for the first 10-30 seconds of the reaction, the chamber 108 may expand and initial frothing of the reaction may be calmed, thus reducing the likelihood of ejecta flowing from the chamber 108 into the volume 106 of the inflatable structure 102. With the valve 122 in the open position, the lifting gas 110 may flow into the volume 106 of the inflatable structure 102.

After a predetermined time, or again based on varying pressure profile of the chamber 108, the controller 132 may actuate the motor 130 to close the valve 122 to reduce the likelihood that end-of-reaction "cough" of very dry powdery ejecta may rise from the chamber 108 into the volume 106 of the inflatable structure 102. After a period as short as 10 and as long as 60 (e.g., about 30 seconds), the controller 132 may actuate the motor 130 to rotate the pulley 128 to release the inflatable structure 102 as described above.

Further or instead, the controller 132 may actuate the motor 130 to open and close the valve 122 to facilitate forming the reactor 103 with a small size relative to the inflatable structure 102. In such implementations, when the gas generation rate of is highest in the chamber 108, the valve 122 may be actuated to increase the flowrate of the lifting gas 110 moving from the chamber 108 and into the volume 106, via the flow path 125 of the coupling 104.

Having described various aspects of the system 100 and exemplary use of the system 100, attention is directed now to description of other features that may be additionally or alternatively used with the system 100. As indicated above, elements with numbers having the same last two digits in the disclosure that follows shall be understood to be analogous to or interchangeable with one another, unless otherwise explicitly made clear from the context, and, therefore, are not described separately from one another, except to note differences or to emphasize certain features.

Figure 2B:
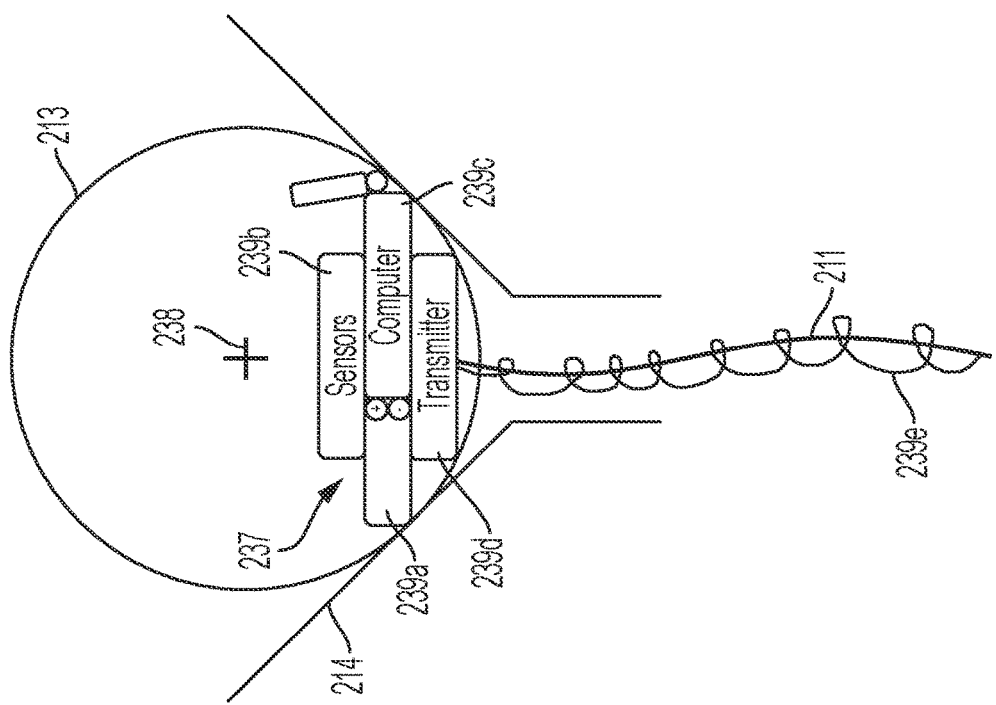
FIG. 2B is a schematic representation of the float valve of the system of FIG. 2A.
Figure 2A:
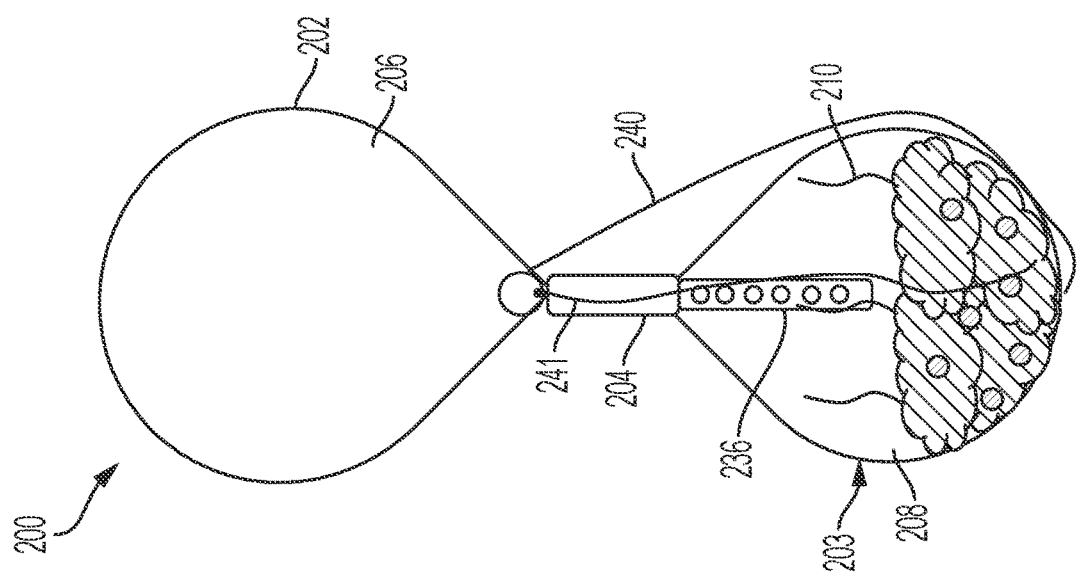
FIG. 2A is a schematic representation of a system for launching an aerostat, the system including a float valve in an inflatable structure and a filter in a reaction chamber.
Figure 3B:
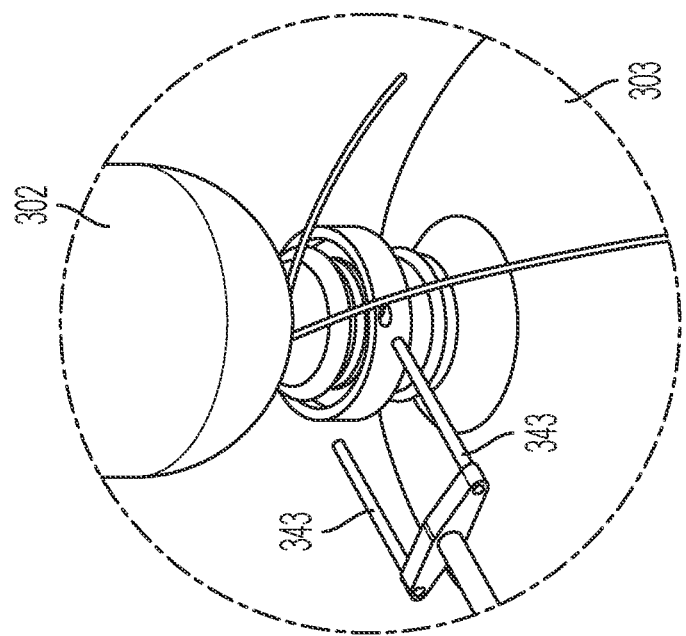
FIG. 3B is a close-up, perspective view of the coupling of FIG. 3A along the area of detail 3B in FIG. 3A.
Figure 3A:
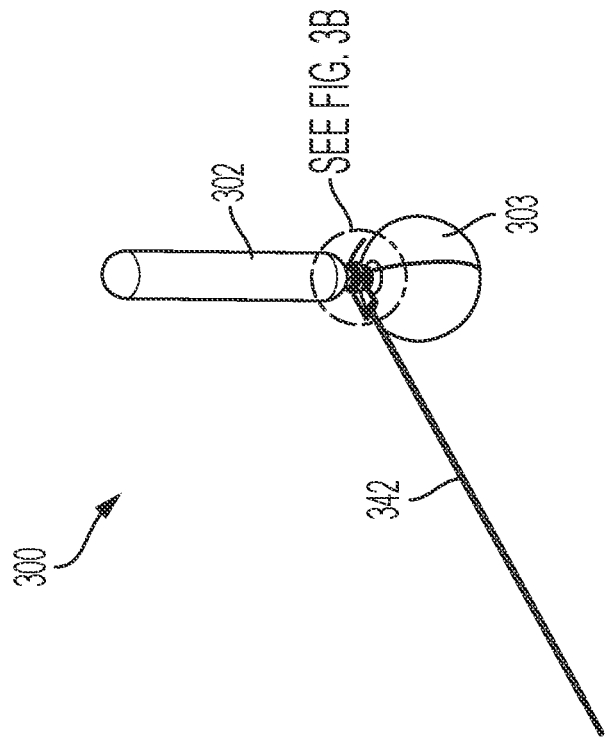
FIG. 3A is a perspective view of a system for launching an aerostat, the system including an inflatable structure and a reactor connectable to one another via a coupling operable using a stabilizing pole.
Figure 3D:
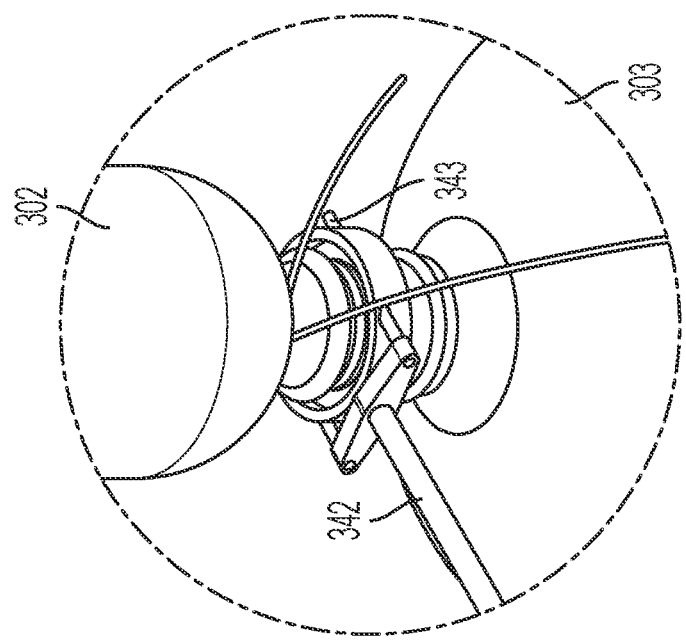
FIG. 3D is a close-up, perspective view of the coupling of FIG. 3A along the area of detail 3D in FIG. 3C.
Figure 3C:
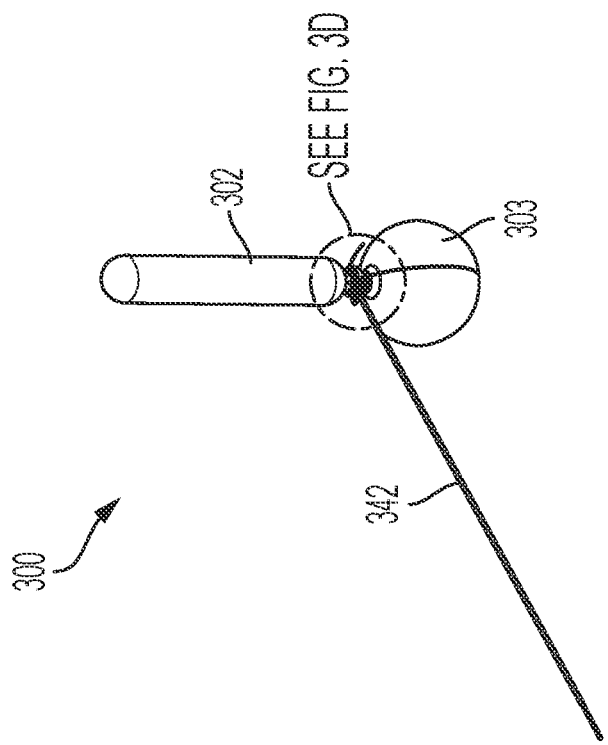
FIG. 3C is a perspective view of the system of FIG. 3A, shown with the forks of the stabilizing pole extending through the coupling to hold the inflatable structure in place on the reactor.
Figure 3G:
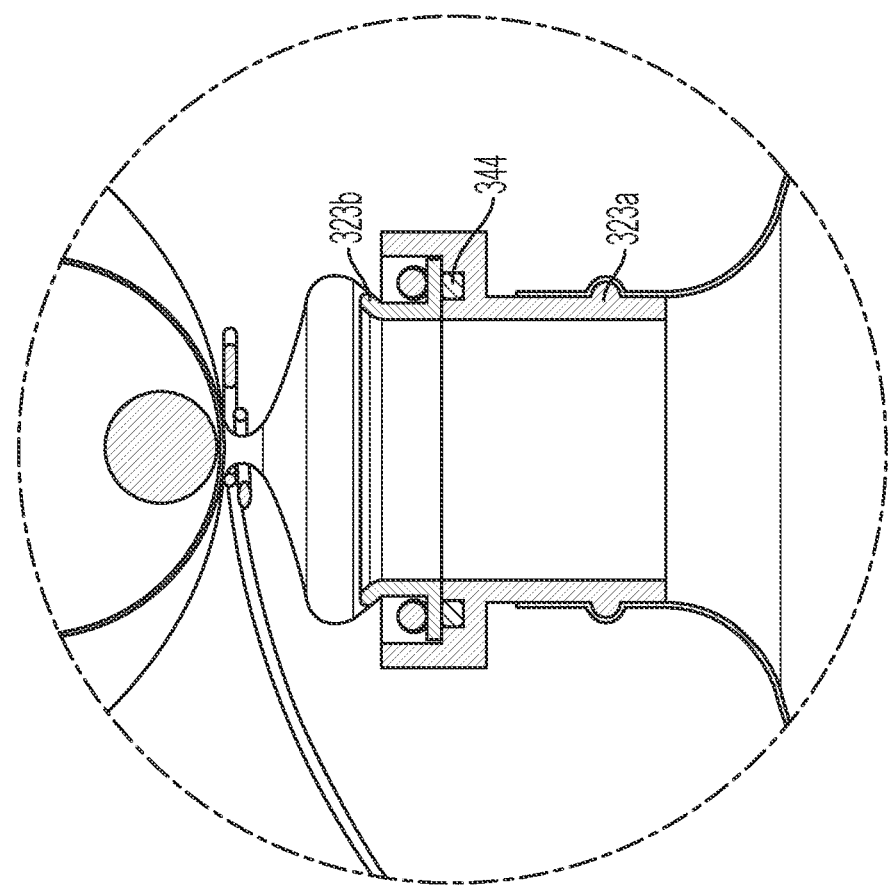
FIG. 3G is a close-up side view of the system of FIG. 3A along the area of detail 3G in FIG. 3F.
Figure 3F:
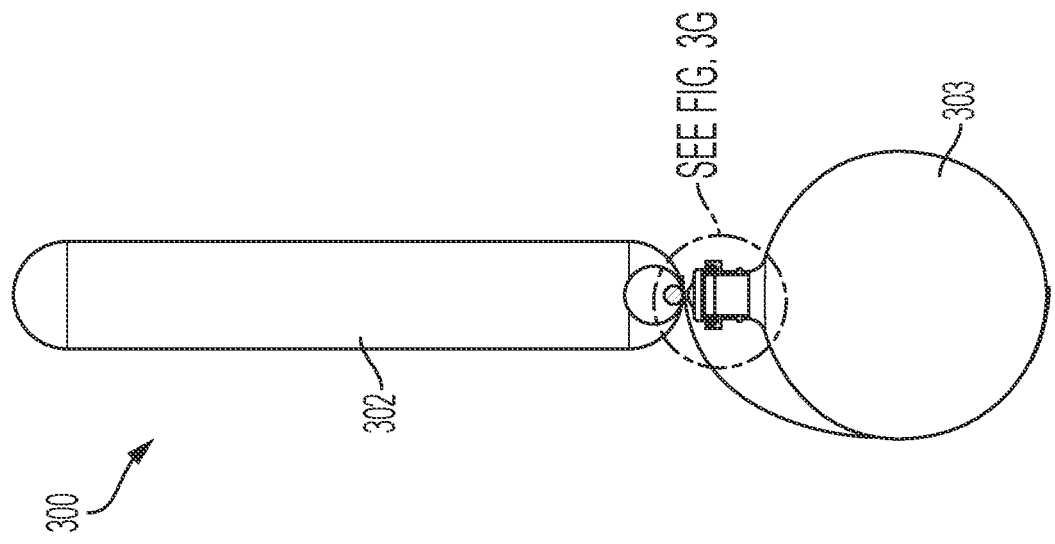
FIG. 3F is a cross-sectional side view of the system of FIG. 3A, taken along the cross-section 3F-4F shown in FIG. 3E.
Figure 3I:
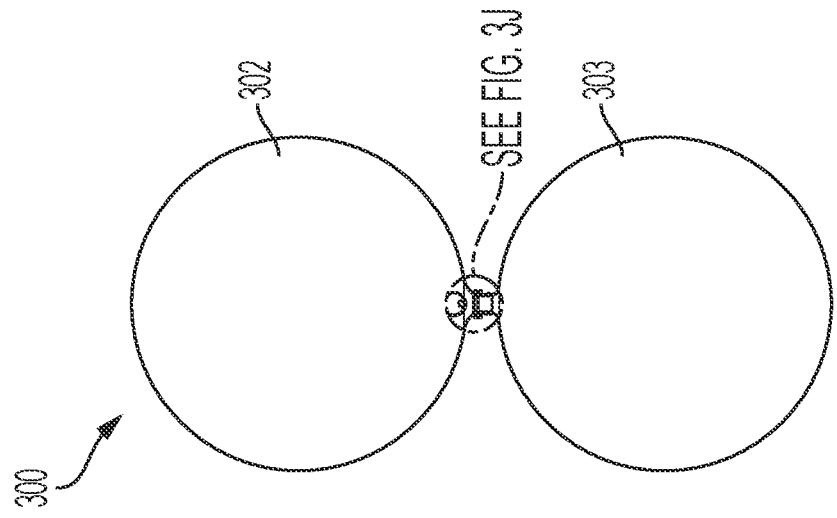
FIG. 3I is a side view of the system of FIG. 3A, taken along the cross-section 3I-3I in FIG. 3H.
Figure 3H:
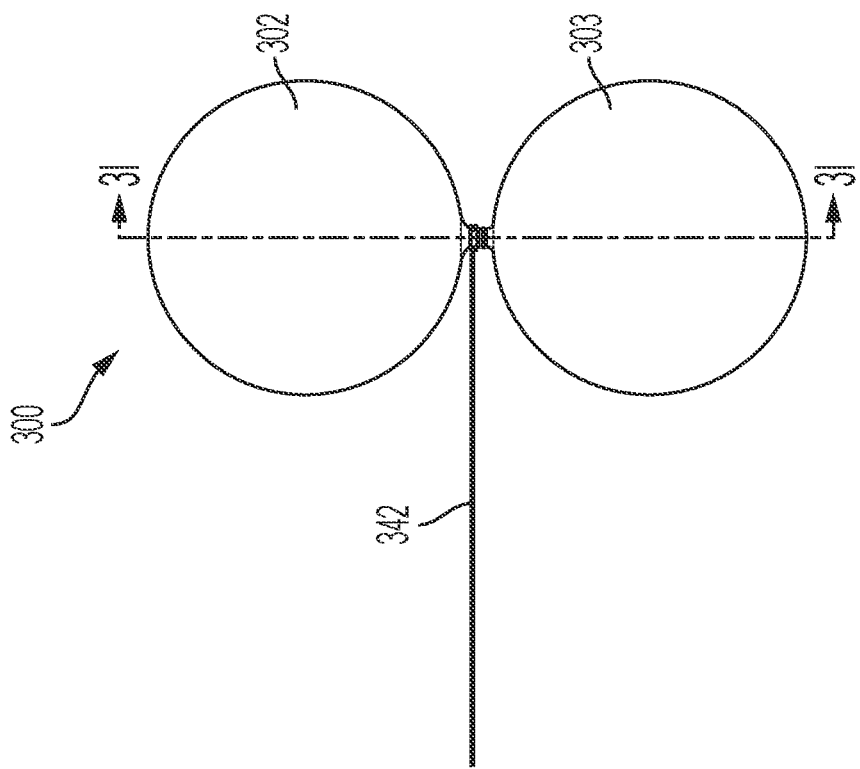
FIG. 3H is a side view of the system of FIG. 3A, shown in mid-fill of the inflatable structure.
Figure 3J:
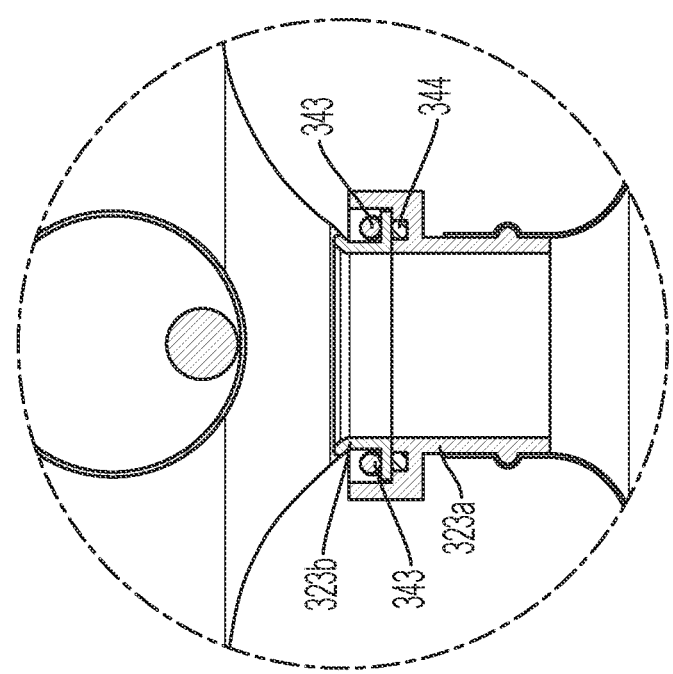
FIG. 3J is a close-up, side view of the system of FIG. 3A, shown along the area of detail 3J in FIG. 3I.
Figure 3L:
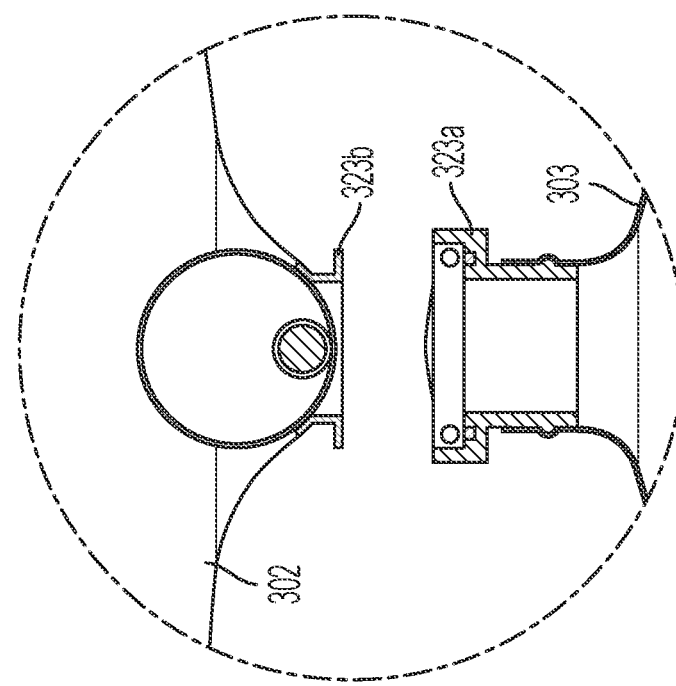
FIG. 3L is a close-up, side view of a cross-section of the system of FIG. 3A, with the cross-section taken along 3L-3L in FIG. 3K.
Figure 3K:
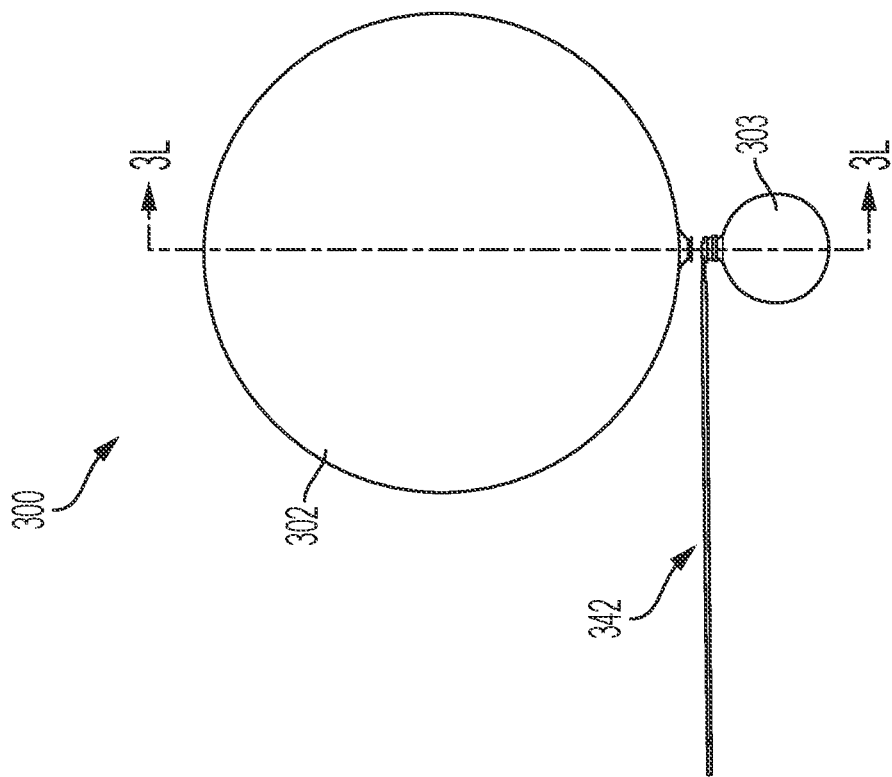
FIG. 3K is a side view of the system of FIG. 3A, shown with the coupling between the inflatable structure and the reactor disconnected following inflation of the inflatable structure.
Figure 4B:
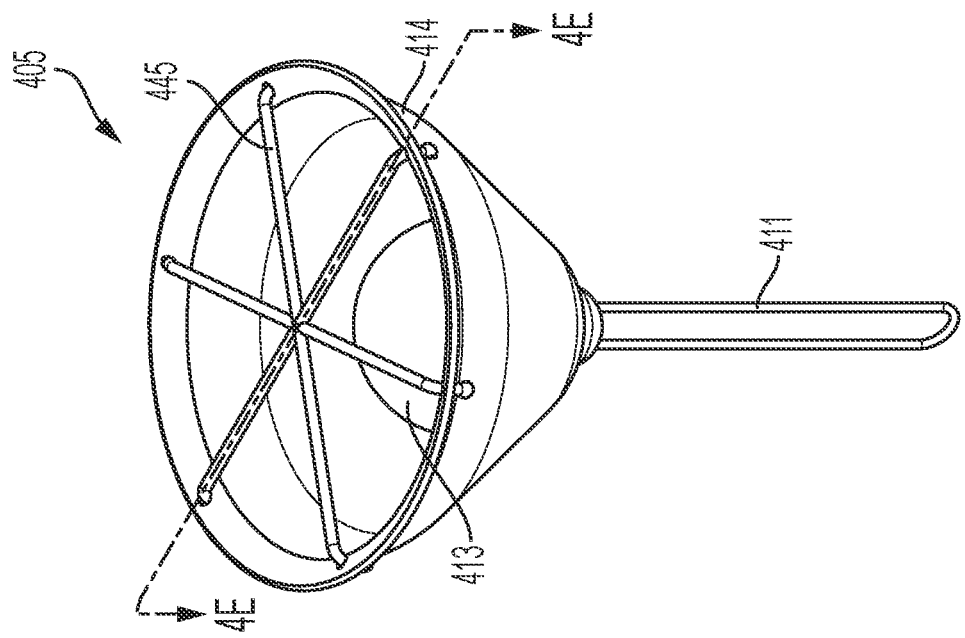
FIG. 4B is a perspective view of the float valve of FIG. 4A, shown with a float disposed between the funnel and a grate.
Figure 4A:
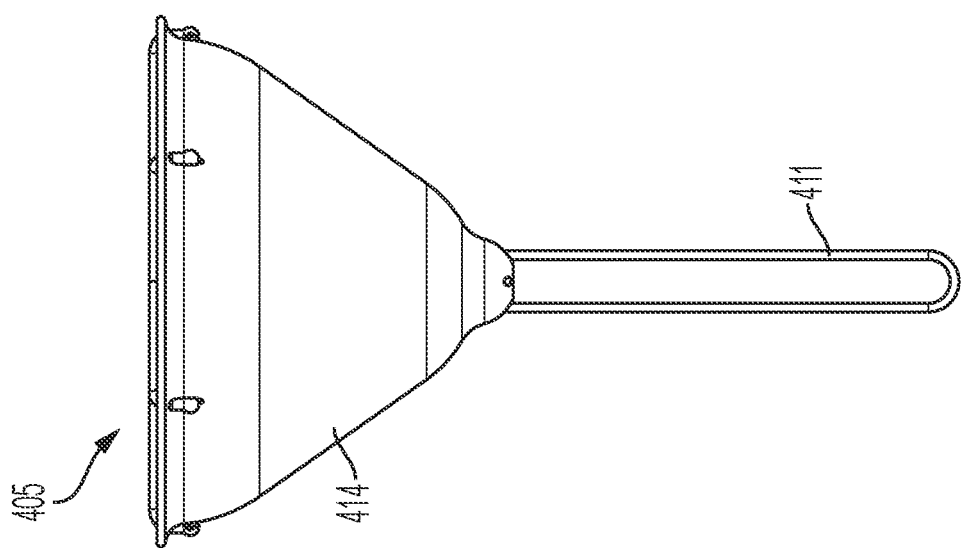
FIG. 4A is a side view of a float valve including a funnel coupled to a tether.
Figure 4D:
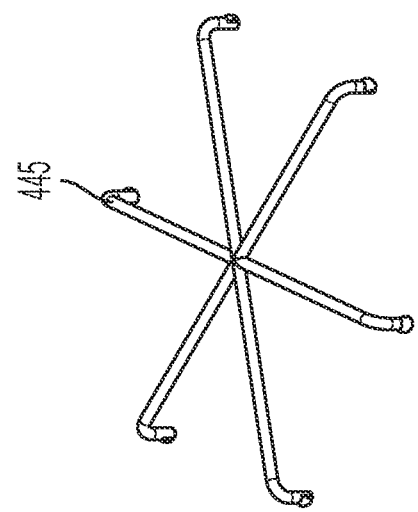
FIG. 4D is a perspective view of the grate of the float valve of FIG. 4A.
Figure 4C:
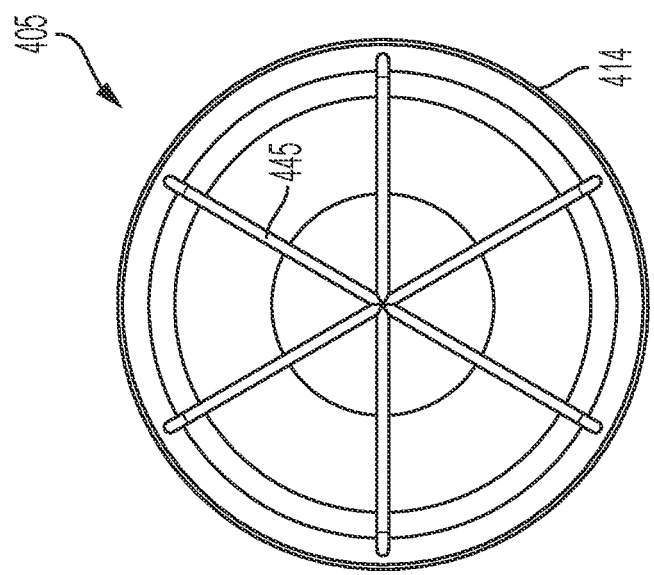
FIG. 4C is a top view of the float valve of FIG. 4A.
Figure 4E:
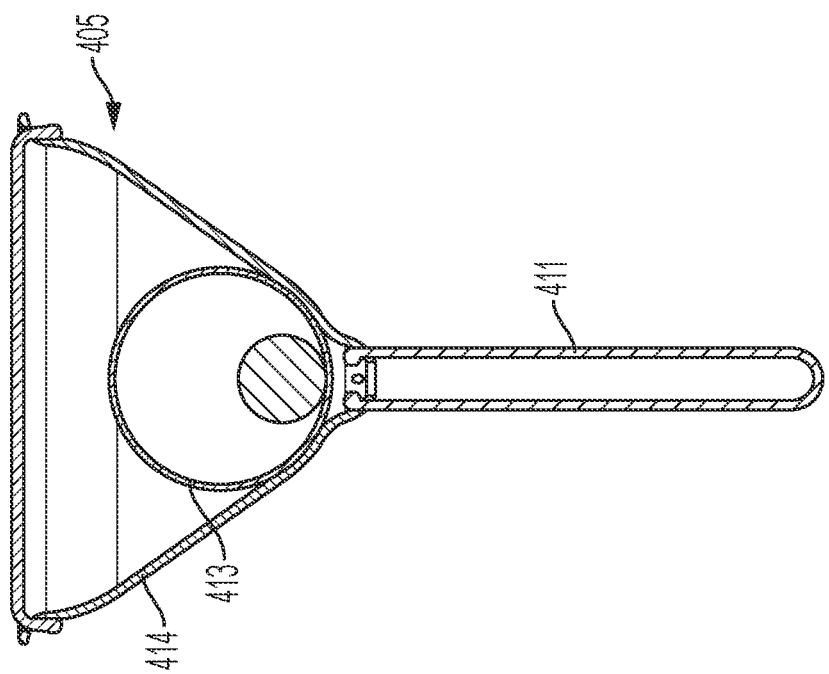
FIG. 4E is a cross-sectional side view of the float valve of FIG. 4A, with the cross-section taken along 4E-4E in FIG. 4B.
Figure 6B:
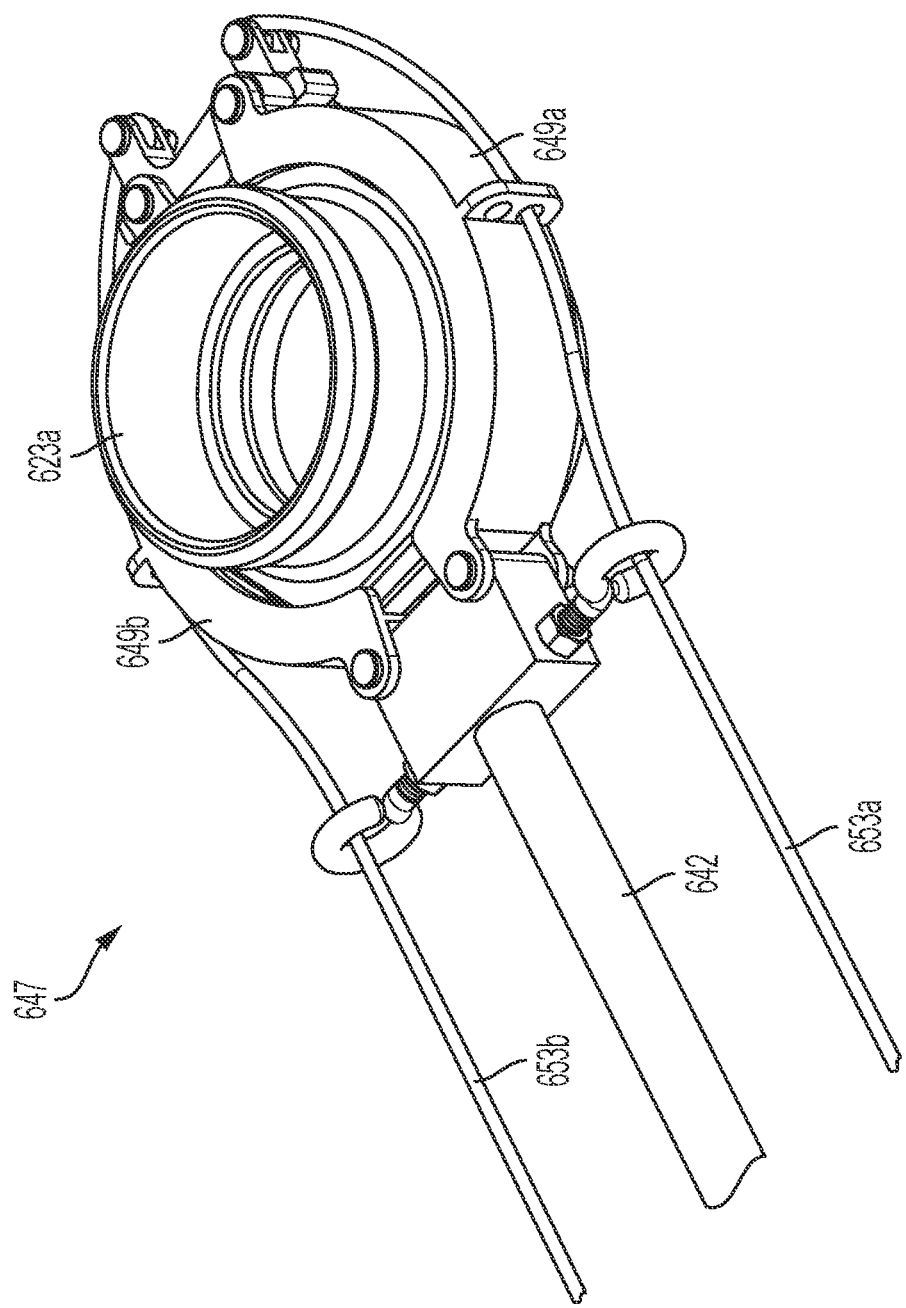
FIG. 6B is a perspective view of the clamp assembly of FIG. 6A, shown with the first connector portion and the second connector portion coupled to one another by the jaws in a closed position.
Figure 6C:
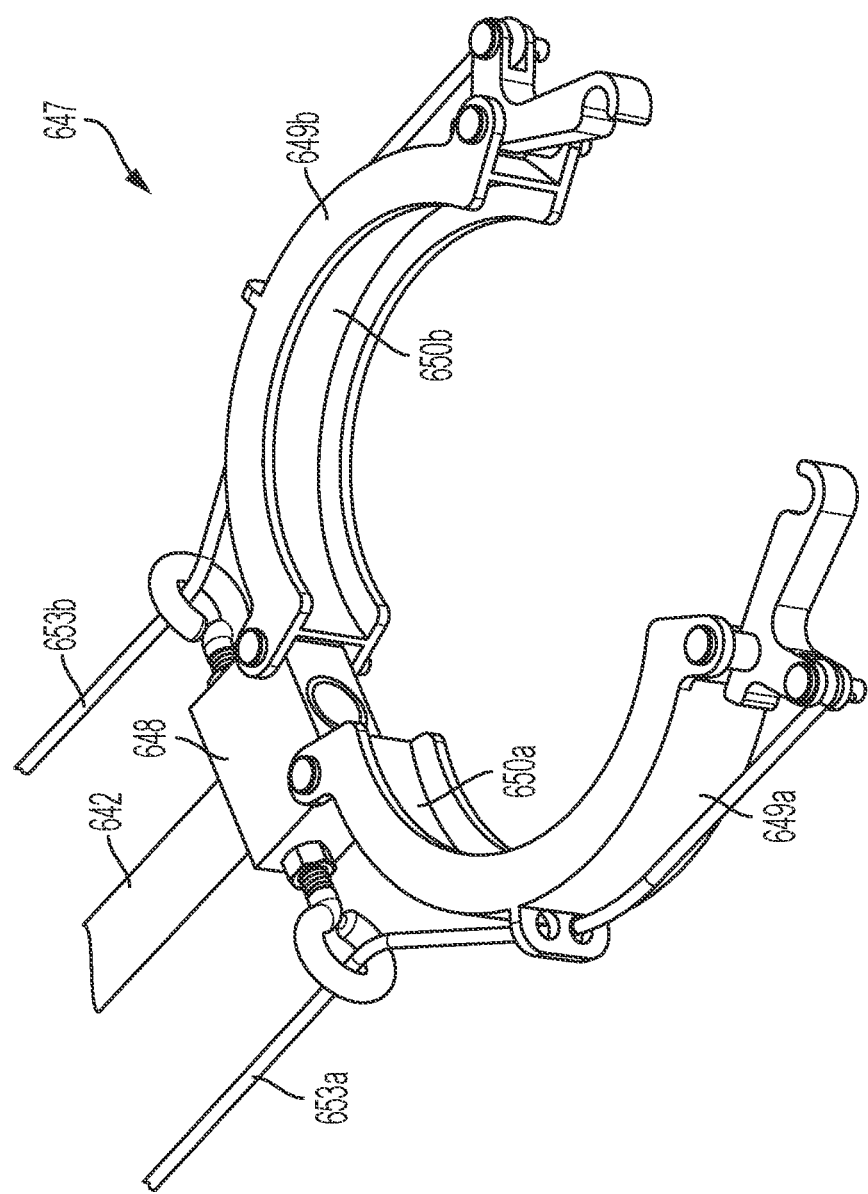
FIG. 6C is close-up perspective view of the jaws of the clamp assembly of FIG. 7A, with the jaws shown in the open position.
Figure 6F:
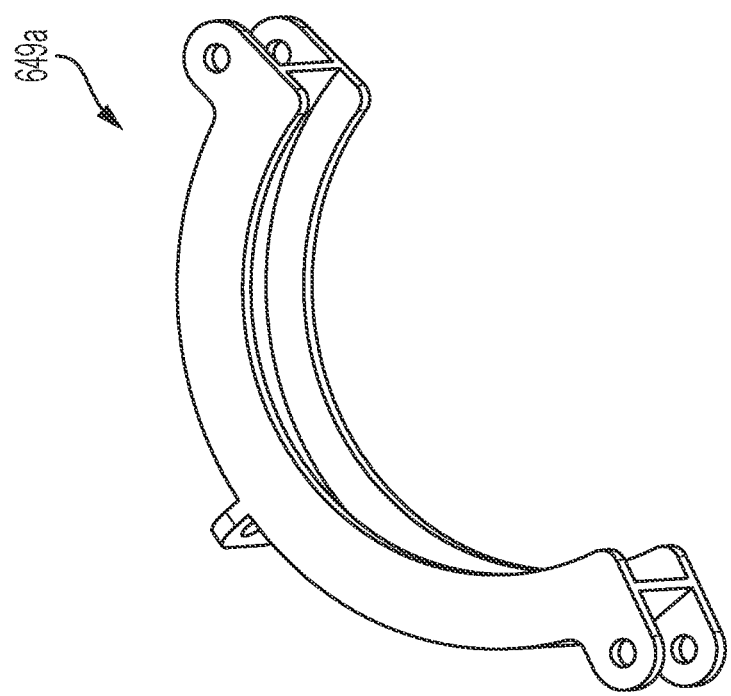
FIG. 6F is a perspective view of a jaw of the clamp assembly of FIG. 6A.
Figure 6E:
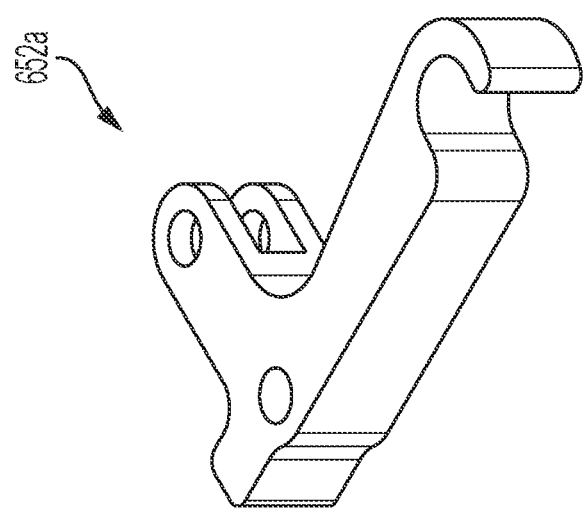
FIG. 6E is a perspective view of a latch arm of the clamp assembly of FIG. 6A.

Referring now to FIGS. 2A and 2B, a system 200 may include a drain valve 205 having a float 213 and a funnel 214. The float 213 may carry an electronics package 237 below a center 238 of the float 213 such that the float 213 may be eccentrically loaded to facilitate seating in the funnel 214. The electronics package 237 may be lightweight and, for example, may include a battery 239a, sensors 239b, a computer 239c, a transmitter 239d, and an antenna 239e. The antenna 239e may be attached to a tether 211 leading out of a volume 206 of an inflatable structure 202 and extending below the inflatable structure 202. The electronics package 237 may act as additional weight to allow the float 213 to more tightly seat the float 213 against the funnel 214.

In some instances, a cable 240 may be attached to the bottom of a reactor 203, and another end of the cable 240 may be wrapped around the inflatable structure 202 in a quick release knot. The cable 240 may be pulled by the reactor 203 as the reactor 203 expands, causing the quick release knot in the cable 240 to release and allow a lifting gas 210 to flow into the inflatable structure 202. The cable 240 may, for example, release the quick release knot when the reactor 203 has reached 15-50% of a fully inflated volume.

The tether 211 may hang from the float 213 into the chamber 208 of the reactor 203 such that the slack of the tether 211 is taken up until the inflatable structure 202 is launched. Additionally, or alternatively, the system 200 may include a filter 236 disposed in a chamber 208 defined by a reactor 203. The filter 236 may be in fluid communication with a coupling 204. In the event of a rupture of a portion of the reactor 203, the filter 236 will make it less likely that ruptured material will clog the coupling 204.

Referring now to FIGS. 3A-3L, a system 300 may include a pole 342 positionable in a coupling 303 to secure a first connector portion 323a and a second connector portion 323b to one another as an inflatable structure 302 is filled from lifting gas generated in a reactor 303. With the pole 342 positioned in the coupling 304, the pole 342 may be manipulated to maneuver the system 300 to reduce the likelihood of kinking of one or more portions of the system 300. That is, the pole 342 may be manipulated to assist in lifting the coupling 304 upward as the reactor 303 expands while also resisting lateral forces (e.g., from wind) on the reactor 303.

For example, the pole 342 may include forks 343 positionable in the first connector portion 323a and the second connector portion 323b to form a fluidic connection between the reactor 303 and the inflatable structure 302. Clearance holes for the forks 343 may be sized such that, when the forks 343 are inserted into the first connector portion 323a and the second connector portion 323b, a gasket 344 may be compressed. When the inflatable structure 302 is filled, the pole 342 may be moved to retract the forks 343 from the first connector portion 323a and the second connector portion 323b to release the inflatable structure 302 from the reactor 303.

Referring now to FIG. 4A-4F, a drain valve 405 may include a float 413, a funnel 414, and a grate 445. The grate 445 may be coupled (e.g., snap fit) to the funnel 414 to retain the float 413 within the funnel 414. For example, a tether 411 may be coupled to the funnel 414 such that tension on the tether 411 may move the drain valve 405 from a first position to a second position within a volume of an inflatable structure according to any one or more of the various different techniques descried herein. As the drain valve 405 moves from the first position to the second position, the grate 445 may retain the float within the funnel 414 such that the drain valve 405 may be operable once the funnel 414 is seated, in the second position, in sealed engagement with an inflatable structure.

Table 2 below shows example calculations for determining the size and weight of the float 413. It is generally important to select the largest diameter of contact of the ball-to-seat interface, ideally spherical, to allow enough water to act below the equator of the float 413 to buoy the float 413 upwards against the downward forces due to the pressure of the water on the float 413 and the weight of the float 413 (plus any added mass to it). If the diameter of the float 413 is too large, the water will not buoy the float 413 upwards. If the diameter of the float 413 is too small, the float 413 may be easily be knocked from a seated position in the funnel 314.

TABLE 2 example calculations for determining size and weight of the float 413.

| Parameter | Value | Units | Variable | Equation |
|---|---|---|---|---|
| Mass fraction of steel ball weight/weight water displaced by float ball | 60% | | eta | |
| Specific gravity of steel | 7.9 | | rhosg | |
| Specific gravity of PE | 1.3 | | rhosgpe | |
| Specific gravity of PE | 1.3 | | rhosgep | |
| Diameter float ball | 38 | mm | dfb | |
| Float ball wall thickness | 1 | mm | tfb | |
| Angle of cone float ball rests in | 35 | degrees | thetad | |
| | 0.61 | rad | thetar | :=PI( )*thetad/180 |
| Contact diameter of float ball in cone | 31.1 | mm | dcd | :=dfb*COS(thetar) |
| Volume of water displaced by portion of float ball above contact diameter | 25,370 | mm^3 | vfbd | :=PI( )*(dfb/2)^3*(2/3 + (9*SIN(thetar) + SIN(3*thetar))/12) |
| Mass water displaced | 25 | grams | mwd | :=Vfbd/1000 |
| Mass float ball | 6 | grams | mfb | :=PI( )*dfb^2*tfb*rhosgpe/1000 |
| Diameter of single inner ballast ball | 14.1 | mm | diwb | :=(1000*eta*(mwd-mfb)*6/(PI( )*rhosg))^(⅓) |
| Diameter of small (multiple) ballast balls | 6 | mm | dsbb | |
| Number of small ballast balls required | 13 | mm | Nbb | :=1000*eta*(mwd-mfb)*6/(PI( )*dsbb^3*rhosg) |

TABLE 2-continued example calculations for determining size and weight of the float 413.

| Parameter | Value | Units | Variable | Equation |
|---|---|---|---|---|
| Volume of epoxy needed to partially fill float ball to achieve desired mass | 11709.05 | mm^3 | Vepxy | :=Vfbd*eta/rhosgep |

Ideally, one kg of aluminum fuel requires 2 kg of water stoichiometrically to react to create about one cubic meter of hydrogen. The heat from the reaction can boil up to 5 kg of water, which will produce about 8.4 cubic meters of steam. Typically, the reaction will be about 85% efficient and the steam and hydrogen may rise into the inflatable structure which then may be released when the reaction is essentially complete. Thus a heavier payload may be attached to the balloon than if the balloon only contained hydrogen. Reaction efficiency can reach as high as 99% though depending on the formulation of reactant that is used.

The more modest the payload, the faster the inflatable structure may rise, until drag creates a steady state rise velocity. As steam condenses, the velocity of the inflatable structure may begin to decrease. Ignoring balloon expansion due to atmosphere thinning with altitude, and assuming a reasonable convective heat transfer coefficient and air temperature acting on the surface of the balloon to condense the steam, and air drag acting on the rising balloon, a typical scenario would be for a payload heavier than just that of the hydrogen alone could lift to be released when the rate of rise ceases. While the inflatable structure rises, steam condenses so the inflatable structure gets smaller (less drag force) but condensed steam means the lift is less, the condensed steam may be drained drain out through actuation of the drain valve 405 (and/or any one or more of the other drain valves described herein) so the condensate is not a parasitic payload.

Exemplary parameters are shown below in Table 3. A time step integration is used to subtract from the gross lift the lift lost to steam condensing and the air drag due to the velocity of the inflatable structure rising. The condensed steam mass is also subtracted from the system mass as the float valve allows the water to drain. The instantaneous acceleration is just the net lift divided by the instantaneous system mass. The instantaneous velocity and height can then also be determined. It can be seen that the altitude is sensitive to the payload and the heat convection coefficient. It is thus desirable to insulate the inflatable structure with a low density material such as an aerogel, which may reduce the heat conduction coefficient by about 50% and decrease the steam condensation rate, giving more time for the inflatable structure to rise to a higher altitude, or set the payload free sooner in flight.

TABLE 3

Exemplary parameters of lift of an inflatable structure drained of condensate.
This analysis assumes that the condensed steam drains out of the balloon, the balloon shrinks, and drag decreases as velocity and balloon size decrease

| Parameter | Value | Units | Variable | Equation |
|---|---|---|---|---|
| Efficiency of reaction | 85% | | etareact | |
| Mass of fuel | 1 | kg | mAl | |
| Mass of water | 7 | kg | mH20 | |
| Mass of steam | 4.3 | kg | msteam | :=etareact*(mH2O-2*mAl) |
| Volume of hydrogen | 1.0 | m^3 | Vhydrogen | :=1.2*etareact*mAl |
| Volume of steam | 7.2 | m^3 | VH20steam | :=msteam*1.69 |
| Balloon diameter | 2.5 | m | Dballoon | :=(VH20H2*6/PI( ))^(⅓) |
| Surface area | 19.7 | m^2 | Aballoon | :=PI( )*Dballoon^2 |
| Cross section area (drag) | 4.9 | m^2 | Adrag | :=PI( )*Dballoon^2/4 |
| Convective heat transfer coefficient | 50 | W/m^2/C. | hcv | |
| Temperature air | 20 | C. | Tair | |
| Heat of Vaporization | 2260 | KJ/kg | hH2O | |
| kg/sec steam condense | 0.009 | kg/sec | mcnds | :=9.8*(glc-msystem) |
| loss of lift per kg steam condensed | 0.015 | kg/sec | lolps | :=mcnds*1.69 |
| time for all steam to condense | 488 | seconds | tcondense | :=msteam*hH2O*1000/(Hcv*Tair*Aballoon) |
| Mass of balloon and lift elements | 0.8 | kg | mble | |
| Initial gross lift capacity | 9.0 | kg | glc | |
| Mass of payload | 1 | kg | mpl | |
| Initial total system mass | 6.05 | kg | msystem | :=mpl + mble + msteam |
| Net initial lift to accelerate the balloon upward | 29.1 | N | Faccinit | :=9.8*(glc-msystem) |
| drag coefficient | 1 | | CD | |
| density air at 20 C. | 1.1 | kg/m^3 | rhoair | |
| integration time increment | 0.2 | sec | tincr | |

TABLE 3-continued

Exemplary parameters of lift of an inflatable structure drained of condensate.
This analysis assumes that the condensed steam drains out of the balloon, the balloon shrinks, and drag decreases as velocity and balloon size decrease

| Parameter | Value | Units | Variable | Equation |
|---|---|---|---|---|
| Maximum height | 993 | m | hmax | |
| Time to maximum height | 402 | sec | tmax | |

Referring now to FIG. 5, a drain valve 505 may include a float 513 and a funnel 514. A first tether (such as any one or more of the various different tethers described herein) may be coupled to the funnel 514 such that tension on the first tether may move the funnel 514 into a neck 507 of an inflatable structure 502. The float 513 may be inside the funnel 514, where the float 513 may be supported on a gasket 546 within a retainer 547, with the retainer 547 preventing prevent the float 513 from ever being too far away from a sealing position, thus reducing the likelihood of unintended gas losses. A second tether 511b may hang from the float 513 and can be used to seat the float 513 within the funnel 514 once water has drained out of the inflatable structure 502 entirely. That is, a payload may be hung from the first tether coupled to the funnel 514 while water is condensing within the inflatable structure 502. Once all of the water has condensed and been expelled from the inflatable structure 502 via the drain valve 505, the first tether may give way to the second tether 511b to allow tension to be entirely in the second tether 511b 808, thus pressing the float 513 into the gasket 546 with more force and forming a more gas-tight seal under the full weight of the payload. A drainage hole 809 allows for water to slowly leak from the valve 804 so as to further discourage additional gas leaking.

Referring now to FIGS. 6A-6F, a clamp system 647 may hold together a first connector portion 623a and a second connector portion 623b to facilitate controlling mechanical coupling and fluid communication between any one or more of the reactors and inflatable structures described herein. The clamp system 647 may include a pole 642 with a pivot block 648 at one end. Jaws 649a, 649b may pivot on the pivot block 648. The jaws 649a, 649b may define grooves 650a, 650b, respectively, having height to constrain movement of the first connector portion 623a and the second connector portion 623b relative to one another while compressing an O-ring 651 contained in the first connector portion 623a.

Latch arms 652a, 652b are supported on ends of the jaws 649a, 649b, respectively. Cords 653a,b are coupled to the latch arms 652a, 652b, respectively. Each one of the cords 653a,b may be pulled to disengage the jaws 649a, 649b, thus releasing the first connector portion 623a and the second connector portion 623b from one another to allow an inflatable structure to float away.

Figure 7:
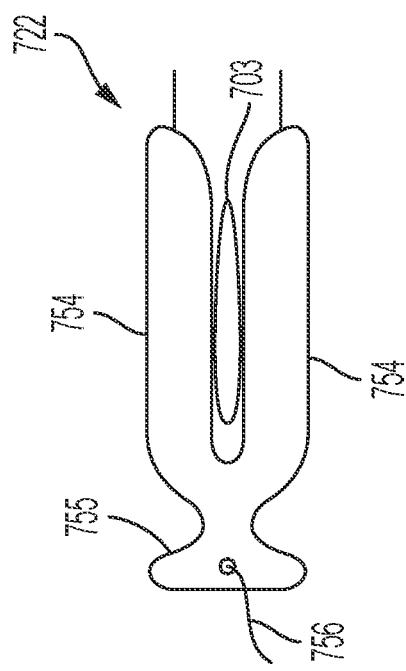
FIG. 7 is a schematic representation of a flexure pinching shut a portion of a conduit between a reaction chamber and an inflatable structure.

Referring now to FIG. 7, a valve 722 may be positioned on a reactor 703 to restrict the flow of lifting gas from the reactor 703 into an inflatable structure. The restriction provided by the valve 722 may reduce the likelihood that ejecta or other waste from reactor 703 may be carried into an inflatable structure. While the valve 722 is shown as a flexure, it shall be appreciated that the valve 722 may additionally or alternatively include a quick-release knot such as a highwayman knot actuatable by a human operator or a motor.

The valve 722 may, for example, include arms 754 having curved surfaces to facilitate mounting to the reactor 703, while reducing the potential for tearing or perforation of material of the reactor 703. The arms 754 may be preloaded in deformation against the compliant materials of the reactor 703. The valve 722 may include a tab 755 that may be pulled via a string 756 to remove the valve 722 from the reactor 703. The string 756 may be pulled by an operator or by a motor.

Figure 8:
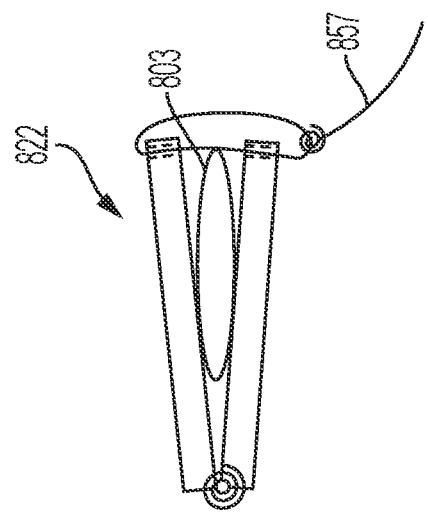
FIG. 8 is a schematic representation of a spring-loaded clip pinching shut a portion of a conduit between a reaction chamber and an inflatable structure.

Referring now to FIG. 8, a valve 822 may be a spring-loaded clip held around a reactor 803 via a rope 823 which may be tied in a quick-release knot. Arms of the valve 822 may be preloaded with a torsional spring which may open facilitate moving the valve 822 away from the reactor 803 to allow gas to flow.

Figure 9:
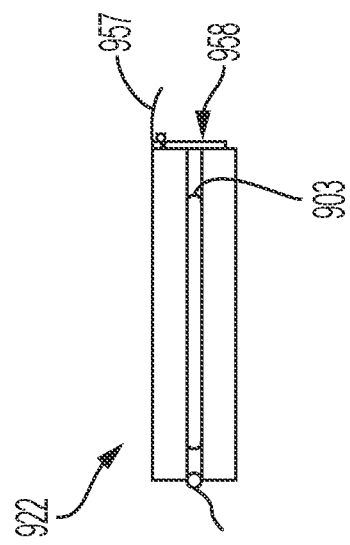
FIG. 9 is a schematic representation of a latched clip pinching shut a portion of a conduit between a reaction chamber and an inflatable structure.

Referring now to FIG. 9, a valve 904 may include a latch 958 holding the valve 904 in place to restrict fluid flow from a reactor 903. The latch 958 may be releasable via tension on a rope 957.

Figure 10:
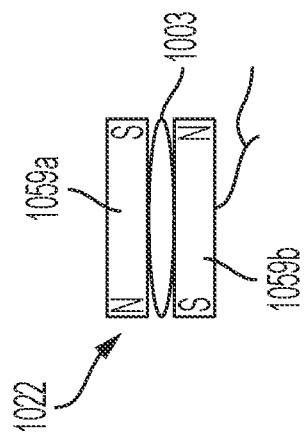
FIG. 10 is a schematic representation of a magnetic clip pinching shut a portion of a conduit between a reaction chamber and an inflatable structure.

Referring now to FIG. 10, a valve 1022 may include magnets 1059a, 1059b holding the valve 1022 in place to restrict fluid flow from a reactor 1003. The magnets 1059a, 1059b may be pulled apart via a string or rope. Further or instead, the magnets 1059a, 1059b may be electromagnets that can be turned on or off by a battery or power source such as a fuel cell.

Figure 11:
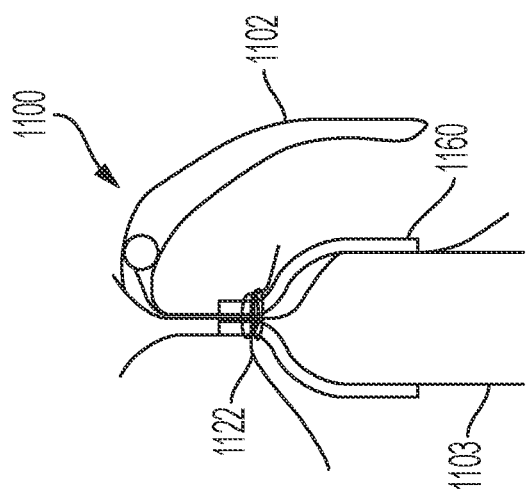
FIG. 11 is a schematic representation of a system for launching an aerostat, the system including a sleeve disposed about a portion of an inflatable structure and a quick-release knot controlling a flow of gas into an inflatable structure.
Figure 13:
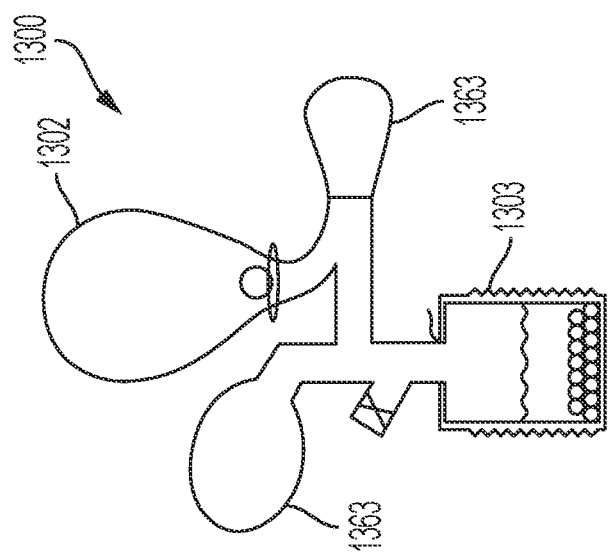
FIG. 13 is a schematic representation of a system for launching an aerostat, the system including an inflatable structure, a reactor, and a coupling, with the coupling including a first reservoir and a second reservoir.

Referring now to FIG. 11, a system 1100 may include an inflatable structure 1102 and a reactor 1103 secured to one another, and a valve 1122 restricting fluid communication from the reactor 1103 to the inflatable structure 1102. The valve 1122 may be, for example, a cord tied in a simple quick-release knot, such as a highwayman hitch, a daisy chain knot, or a mooring hitch. The ends of the knot may be marked, with the quick release end having a flag or colored marking to differentiate it from the non-releasing end. The cord may be, for example, a low-friction rope such as silk or braided nylon, to allow the rope to pass over the flexible chambers without grabbing it and causing a tear.

In some instances, the system 1100 may further include a sleeve 1160 positioned over the reactor 1103 and/or the inflatable structure 1102 to reduce the likelihood that securing and/or removal of the quick-release knot of the valve 1122 may cause tears. For example, the sleeve 1160 may be made from a thick latex or some other flexible, resilient material such that the sleeve 1160 may additionally, or alternatively impart strength against pressure of the reactor 1103.

Figure 12:
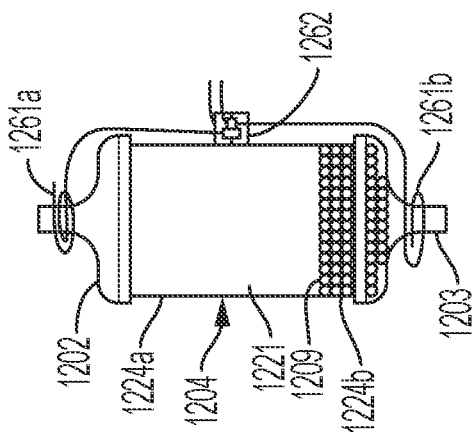
FIG. 12 is a schematic representation of a coupling including a winch and ropes coupled to the winch, with the ropes shown restricting fluid communication of the coupling.

Referring now to FIG. 12, a coupling 1204 may include a first rope 1261a and a second rope 1261b. The first rope 1261a may be coupled to a first end region 1224a of a conduit 1221 to restrict fluid communication from the coupling 1204 to an inflatable structure 1202, and the second rope 1261b may be coupled to a second end region 1224b of the conduit 1221 to restrict fluid communication between the coupling 1204 and a reactor 1203. The first rope 1261a and the second rope 1261b may each be coupled to a winch 1262 using different diameter pulleys. As the winch 1262 is actuated, the pulleys rotate at different speeds, thus pulling the first rope 1261a and the second rope 1261b at different rates. More specifically, the second rope 1261b may be pulled faster than the first rope 1261a to allow an activated aluminum 1209 to fall from the coupling 1204 into the reactor 1203. With the first rope 1261a pulled at a slower rate, the first rope 1261a may restrict flow of a lifting gas into the inflatable structure 1202 during the initial stages of formation of the lifting gas to reduce the likelihood of waste entering the inflatable structure 1202. At some time after the knot in the second rope 1261b is released, the movement of the winch 1262 may release the knot in the first rope 1261a to allow lifting gas to enter the inflatable structure 1202.

In certain implementations, a system 1300 may include a reactor 1303 that is rigid. Along a flow path from the reactor 1303 to an inflatable structure 1302, the system 1300 may include one or more reservoirs 1363 that may be used to accommodate changes in pressure along the flow path and, in certain instances, may catch debris flowing along the flow path before such debris reaches the inflatable structure 1302, Further, or instead, the flow path may include one or more sharp bends to reduce the likelihood that solid or liquid reaction products may reach the inflatable structure 1302. Thus, the system 1300 may behave like a resistor-capacitor-resistor network to control the flow of lifting gas from the reactor 1303 to the inflatable structure 1302.

Figure 14:
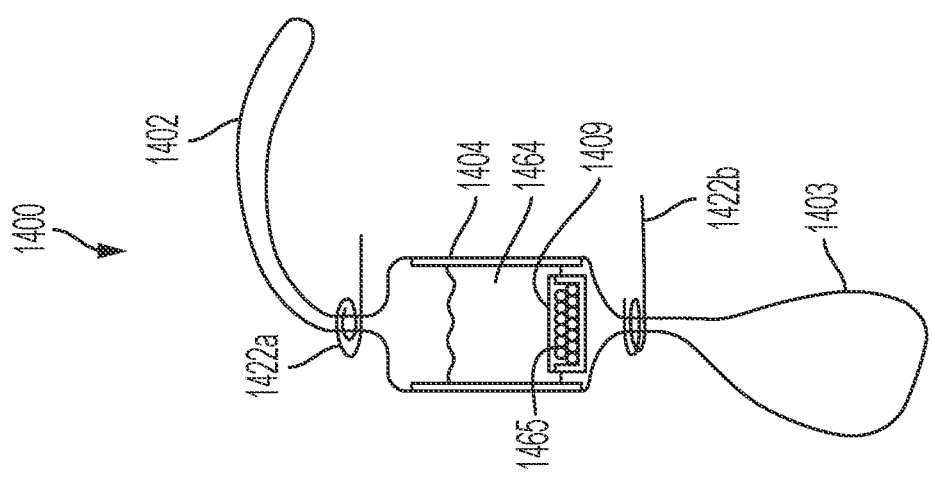
FIG. 14 is a schematic representation of a system for launching an aerostat, the system including an inflatable structure, a reactor, and a coupling, with the coupling including a membrane between reactants.

Referring now to FIG. 14, a system 1400 may include an inflatable structure 1402 and a reactor 1403 coupled to one another via a coupling 1404. Water 1464 and an activated aluminum 1409 may be stored in the coupling 1404, with a membrane 1465 sealing the activated aluminum 1409 from the water 1464 until the reaction is ready to be initiated. A first valve 1422a may seal the coupling 1404 from the inflatable structure 1402, a second valve 1422b may seal the coupling 1404 from the reactor 1403. In certain implementations, the membrane 1465 may be pierced in the coupling 1404 to allow the water an the activated aluminum 1409 to begin reacting in the coupling 1404 as the second valve 1422b is released to move the reactants into the reactor 1403. The first valve 1422a may be later released to allow lifting gas to move from the reactor 1403 into the inflatable structure 1402 via the coupling 1404.

Referring now to FIGS. 15A and 15B, a system 1500 may be arranged for ground deployment. For example, the system 1500 may include a balance 1566 to support the weight of a coupling 1504 and an inflatable structure 1502. The balance 1566 may include a lever 1567, a tripod 1568, and a counter weight 1569. The lever 1567 may be supported on the tripod 1568 such that the lever 1567 may pivot about a fulcrum 1570. On one side of the fulcrum 1570, the lever 1567 may be pivotably secured to the coupling 1504. On the other side of the fulcrum 1570, the lever 1567 may be coupled to the counter weight 1569. As a reactor 1503 expands during formation of a lifting gas, the lever 1567 may pivot to support the reactor 1503 as the reactor expands.

Figure 16C:
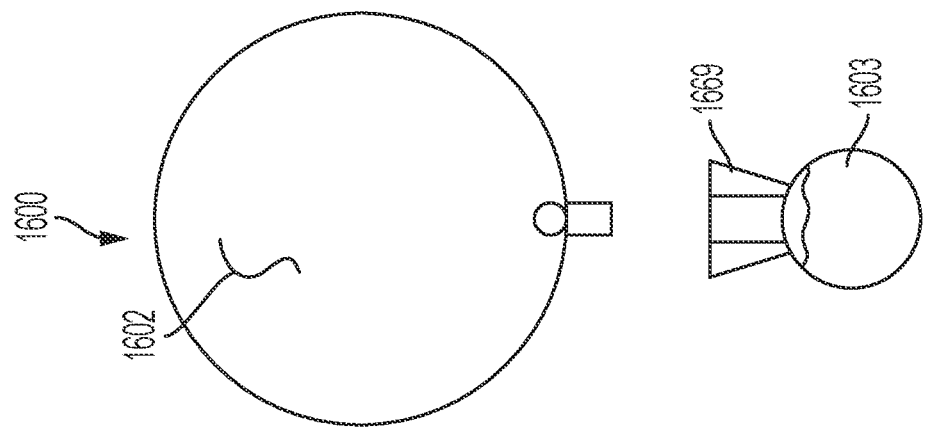
FIGS. 16A-16C are schematic representations of a temporal sequence of mid-air deployment of a system for launching an aerostat.
Figure 16B:
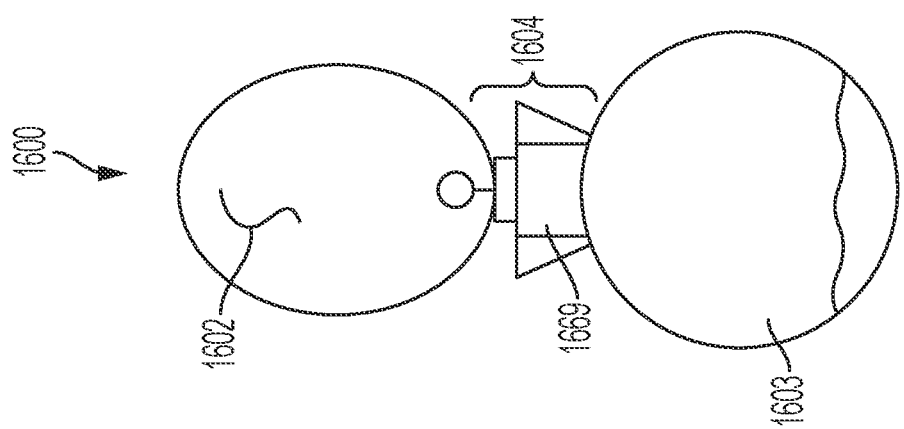
Figure 16A:
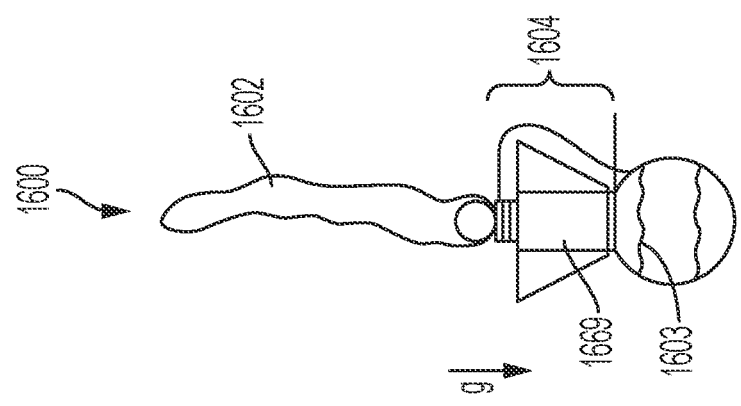

Referring now to FIGS. 16A-16C, a system 1600 may be arranged for mid-air deployment. For example, an inflatable structure 1602 may be coupled to a reactor 1603 via a coupling 1604. The coupling 1604 may include fins 1669 to increase stability of the system 1600 as the system falls while the inflatable structure 1602 is filled with lifting gas from the reactor 1603.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A coupling for delivering a lifting gas to launch an aerostat, the coupling comprising:
   a conduit having a first end region and a second end region defining a longitudinal axis therebetween, the conduit defining a flow path along the longitudinal axis;
   a butterfly valve including a disk supported along the flow path, the disk rotatable about an axis transverse to the longitudinal axis;
   a first connector portion disposed along the first end region of the conduit; and
   a motor mechanically coupled to the disk and to the first connector portion, the motor actuatable to move the first connector portion in a direction parallel to the longitudinal axis in coordination with rotation of the disk about the axis transverse to the longitudinal axis.

2. The coupling of claim 1, wherein the conduit defines a groove along at least one of the first end region or the second end region.

3. The coupling of claim 1, wherein the motor is a stepper motor.

4. The coupling of claim 1, wherein the motor is actuatable to rotate in a first direction and in a second direction opposite the first direction.

5. The coupling of claim 1, further comprising a shaft, a pulley, and a cord, wherein the shaft extends along the axis transverse to the longitudinal axis, the shaft is coupled to the motor, the disk and the pulley are each fixedly coupled to the shaft, and the first connector portion and the pulley are coupled to one another via the cord, and actuation of the motor rotates the shaft to rotate the disk of the butterfly valve in the flow path to control fluid communication along the flow path, and continued actuation of the motor rotates the pulley to tension the cord to decouple the first connector portion from a second connector portion.

6. The coupling of claim 5, further comprising a controller including a processing unit and one or more computer-readable storage media, the one or more computer-readable storage media having stored thereon instructions for causing the processing unit to carry out operations including
   actuating the motor to move the disk of the butterfly valve back and forth between a first position and a second position to control fluid communication between the first end region and the second end region of the conduit along the flow path, and
   actuating the motor to wrap the cord about the pulley to release the first connector portion from a second connector portion.

* * * * *